(12) United States Patent
Fujita et al.

(10) Patent No.: US 7,424,580 B2
(45) Date of Patent: Sep. 9, 2008

(54) DATA TRANSFER CONTROL DEVICE, ELECTRONIC INSTRUMENT, PROGRAM AND METHOD OF FABRICATING ELECTRONIC INSTRUMENT

(75) Inventors: Shinichiro Fujita, Kitakyushu (JP); Hiroyuki Kanai, Shojiri (JP); Akemi Ito, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 305 days.

(21) Appl. No.: 10/625,643

(22) Filed: Jul. 24, 2003

(65) Prior Publication Data

US 2004/0167999 A1 Aug. 26, 2004

(30) Foreign Application Priority Data

Aug. 13, 2002 (JP) .............................. 2002-235667

(51) Int. Cl.
*G06F 13/00* (2006.01)
(52) U.S. Cl. .......................... 711/154; 710/33; 710/306
(58) Field of Classification Search .................. 711/154
See application file for complete search history.

(56) References Cited

U.S. PATENT DOCUMENTS

| 5,978,591 | A | * | 11/1999 | Bartholomew et al. ....... 717/168 |
| 6,115,771 | A | * | 9/2000 | Born .......................... 710/315 |
| 6,202,160 | B1 | | 3/2001 | Sheikh et al. |
| 6,202,209 | B1 | * | 3/2001 | Bartholomew et al. ....... 717/173 |
| 2004/0034720 | A1 | | 2/2004 | Fujita et al. |
| 2004/0128405 | A1 | | 7/2004 | Fujita et al. |
| 2004/0167995 | A1 | | 8/2004 | Fujita et al. |

* cited by examiner

*Primary Examiner*—Kevin Ellis
*Assistant Examiner*—Matthew Bradley
(74) *Attorney, Agent, or Firm*—Oliff & Berridge, PLC

(57) ABSTRACT

Information that is transferred through a bus BUS1 (conforming to IEEE 1394) is downloaded into a rewrite area storing device information (such as GUID or config ROM) and data transfer control program information (such as a SBP-2 firmware program), and rewriter processing is performed to write the information into the rewrite area. When it is detected that no device is connected to a bus BUS2 (conforming to ATA/ATAPI or IDE), the rewriter processing starts. The detection of whether or not a device is connected to BUS2 is based on the result of an access to a register of the device. In a download mode, the information is written into the rewrite area by transferring data to and from a PC connected to BUS1.

8 Claims, 17 Drawing Sheets

DURING USE (ORDINARY OPERATING MODE)

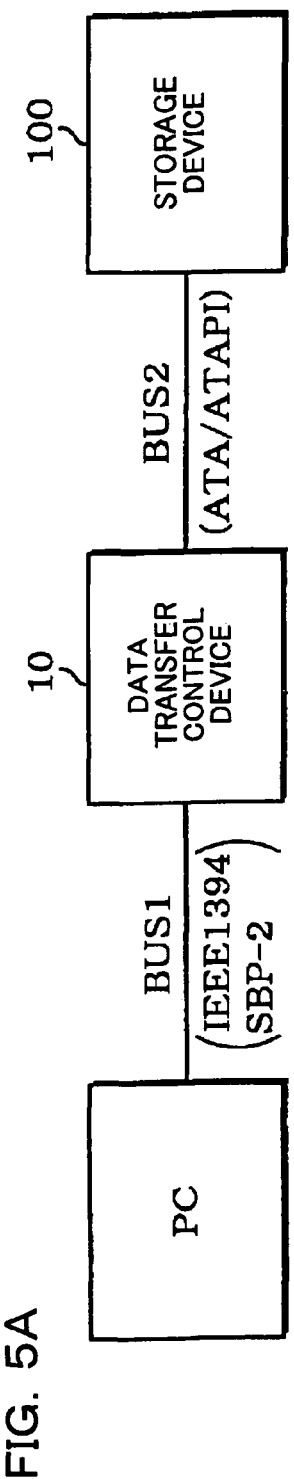
FIG. 5A
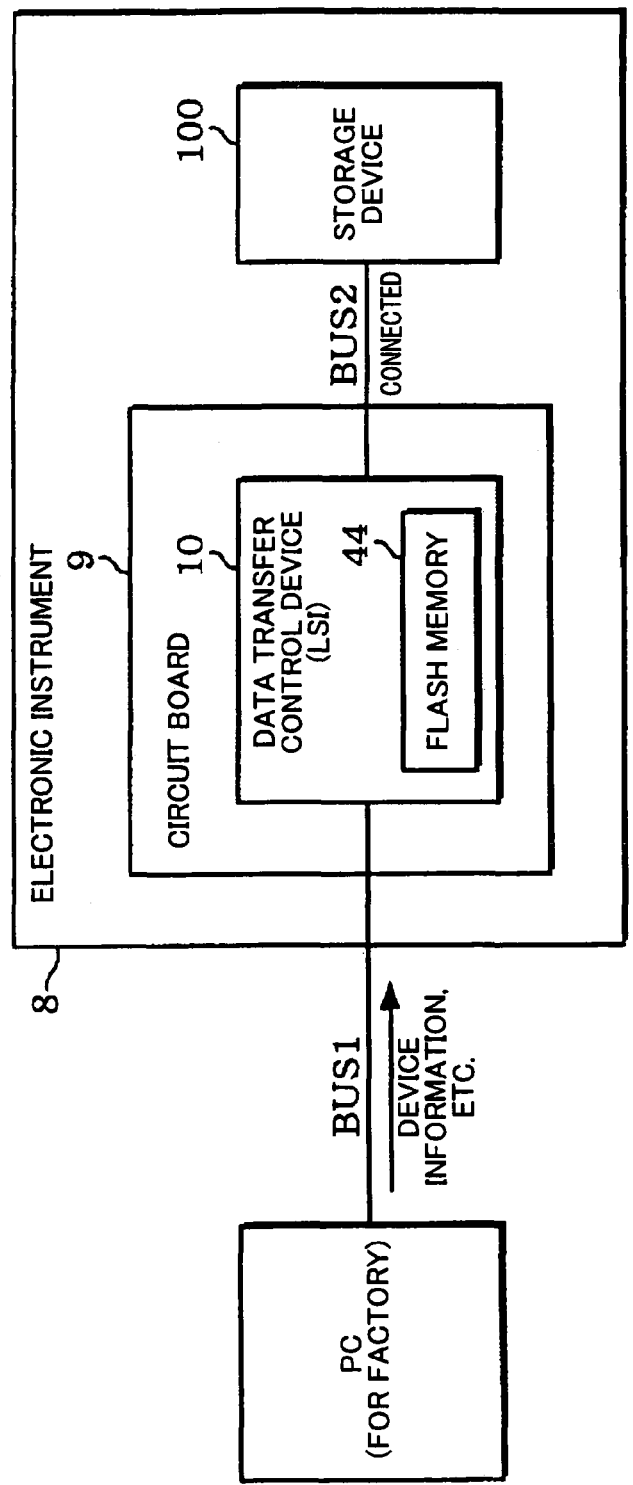
FIG. 5B DURING FABRICATION (DOWNLOAD MODE)

FLASH MEMORY (NON-VOLATILE MEMORY)

FIG. 10A
STATUS REGISTER

| 7 | 6 | 5 | 4 | 3 | 2 | 1 | 0 |
|---|---|---|---|---|---|---|---|
| BSY | DRDY | # | # | DRQ | obs | obs | ERR |

FIG. 10B  ATA

| REGISTER | |
|---|---|
| SECTOR COUNTER | 01h |
| SECTOR NUMBER | 01h |
| CYLINDER LOW | 00h |
| CYLINDER HIGH | 00h |
| DEVICE/HEAD | 00h |

FIG. 10C  ATAPI

| REGISTER | |
|---|---|
| SECTOR COUNTER | 01h |
| SECTOR NUMBER | 01h |
| CYLINDER LOW | 14h |
| CYLINDER HIGH | EBh |
| DEVICE/HEAD | 00h OR 10h |

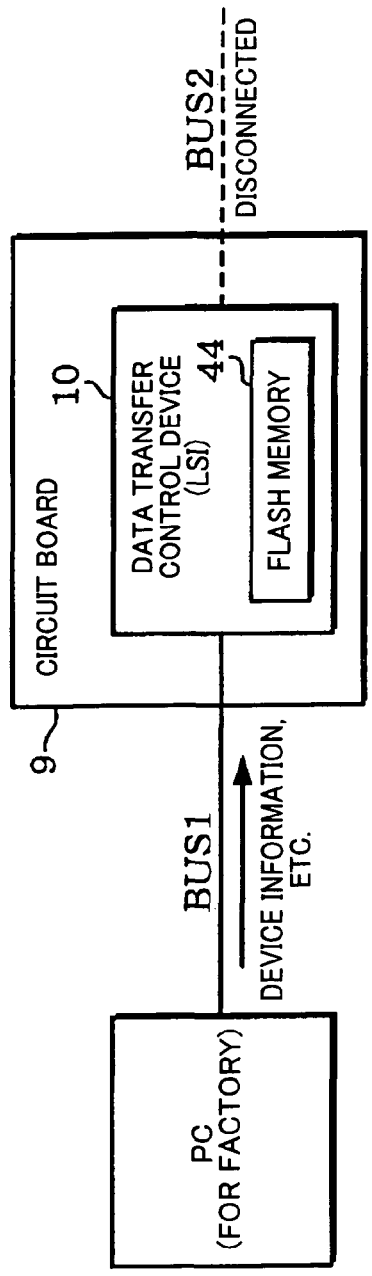
FIG. 11A  DURING FABRICATION (DOWNLOAD MODE)
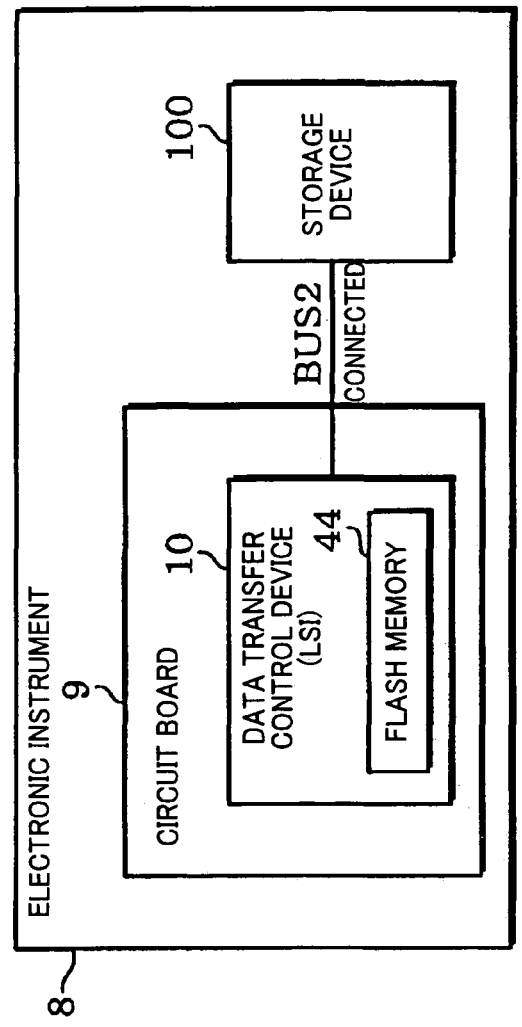
FIG. 11B  DURING FABRICATION (INCORPORATION OF CIRCUIT BOARD)

FIG. 12A
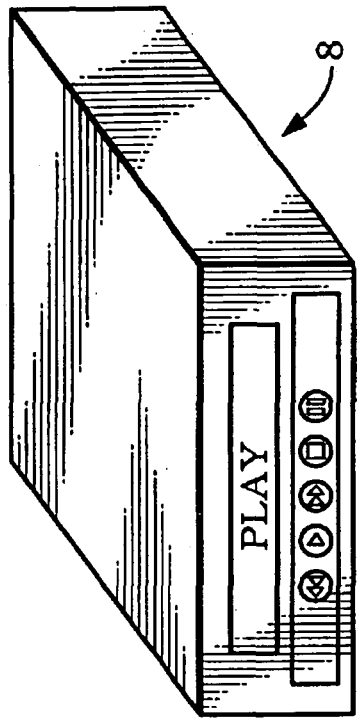
FIG. 12B DURING USE (ORDINARY OPERATING MODE)
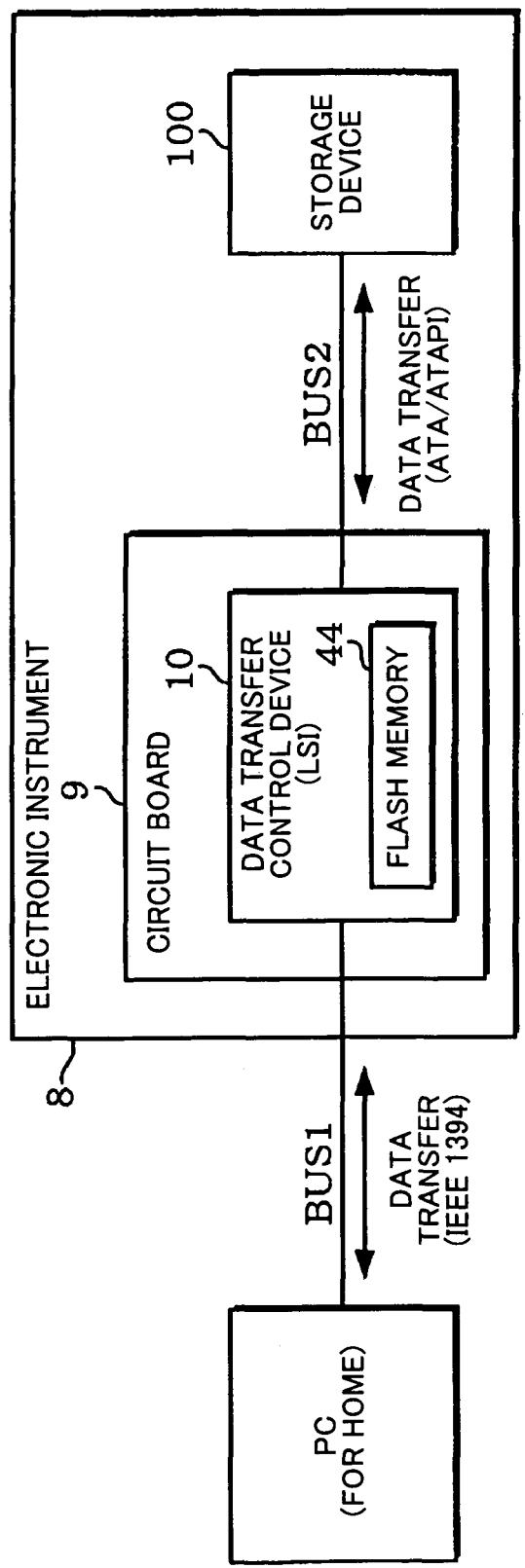

PROGRAM DOWNLOAD

CONFIG ROM DOWNLOAD

DOWNLOAD END

PIO READ (STORAGE DEVICE → DATA TRANSFER CONTROL DEVICE → PC)

PIO WRITE (PC → DATA TRANSFER CONTROL DEVICE → STORAGE DEVICE)

DATA TRANSFER CONTROL DEVICE, ELECTRONIC INSTRUMENT, PROGRAM AND METHOD OF FABRICATING ELECTRONIC INSTRUMENT

Japanese Patent Application No. 2002-235667, filed on Aug. 13, 2002, is hereby incorporated by reference in its entirety.

BACKGROUND OF THE INVENTION

The present invention relates to a data transfer control device, an electronic instrument, a program, and a method of fabricating an electronic instrument.

An interface standard called IEEE 1394 has recently attracted attention. Not only can computer peripherals such as hard disk drives, optical disk drives, printers, and scanners be connected to a bus under this IEEE 1394, but also domestic electrical products such as video cameras, VCRs, and TVs. That is why this standard is expected to enable a dramatic acceleration in the digitalization of electronic instruments.

An electronic instrument provided with an interface such as one for this IEEE 1394 must have a GUID that is identification information specific to that electronic instrument. For that reason, it is necessary to write device information such as a global unique ID (GUID) and configuration ROM information to flash memory (generally speaking: non-volatile memory) at shipping.

However, since it is necessary to do this writing of device information to each electronic instrument individually, it is preferable to do this during the first half of the fabrication process, as far as possible. More specifically, it is desirable to write this device information to the circuit board on which the LSI of the data transfer control device is mounted, before connection to a storage device such as a CD drive or hard disk drive.

BRIEF SUMMARY OF THE INVENTION

According to one aspect of the present invention, there is provided a data transfer control device for data transfer through a bus, comprising:

a rewriter which loads and writes information transferred through a first bus into a rewrite area of a non-volatile memory storing at least one of device information and data transfer control program information; and a rewriter activation section which causes the rewriter to start processing when a second bus is detected to have no connection to any device.

According to another aspect of the present invention, there is provided a method of fabricating an electronic instrument having a data transfer control device and a second device connected to a second bus of the data transfer control device, the method comprising:

disconnecting the second device from the second bus to start rewriter processing that is activated when the second device is disconnected from the second bus;

loading and writing information transferred through a first bus into a rewrite area by the rewriter processing, the rewrite area storing at least one of device information and data transfer control program information; and connecting the second device to the second bus after the writing of the information into the rewrite area.

BRIEF DESCRIPTION OF THE SEVERAL VIEWS OF THE DRAWING

FIGS. 5A and 5B are illustrative of the bus bridge function of the data transfer control device and a method of fabricating an electronic instrument.

FIGS. 10A, 10B, and 10C are illustrative of the various ATA registers.

FIGS. 11A and 11B are illustrative of the method of fabricating an electronic instrument.

FIGS. 12A and 12B are illustrative of the method of fabricating an electronic instrument and the data transfer control method.

DETAILED DESCRIPTION OF THE EMBODIMENT

Embodiments of the present invention are described below.

Note that the embodiments described below do not in any way limit the scope of the present invention laid out in the claims herein. In addition, all elements of the embodiments described below should not be taken as essential requirements of the present invention.

1. IEEE 1394 and SBP-2

1.1 Layer Structure

A protocol called the Serial Bus Protocol 2 (SBP-2) has been proposed as an upper-level protocol comprising some of the functions of the transaction layer under IEEE 1394. This SBP-2 (generally speaking: SBP) has been proposed in order to enable the use of the SCSI (MMC-2) command set on the IEEE 1394 protocol. In addition to minimizing changes to the command set used in electronic instruments that conform to the existing SCSI standards, use of this SBP-2 ensures that electronic instruments that conform to IEEE 1394 can also be used. This therefore enables a simplification of the design and development of electronic instruments.

Figure 1:
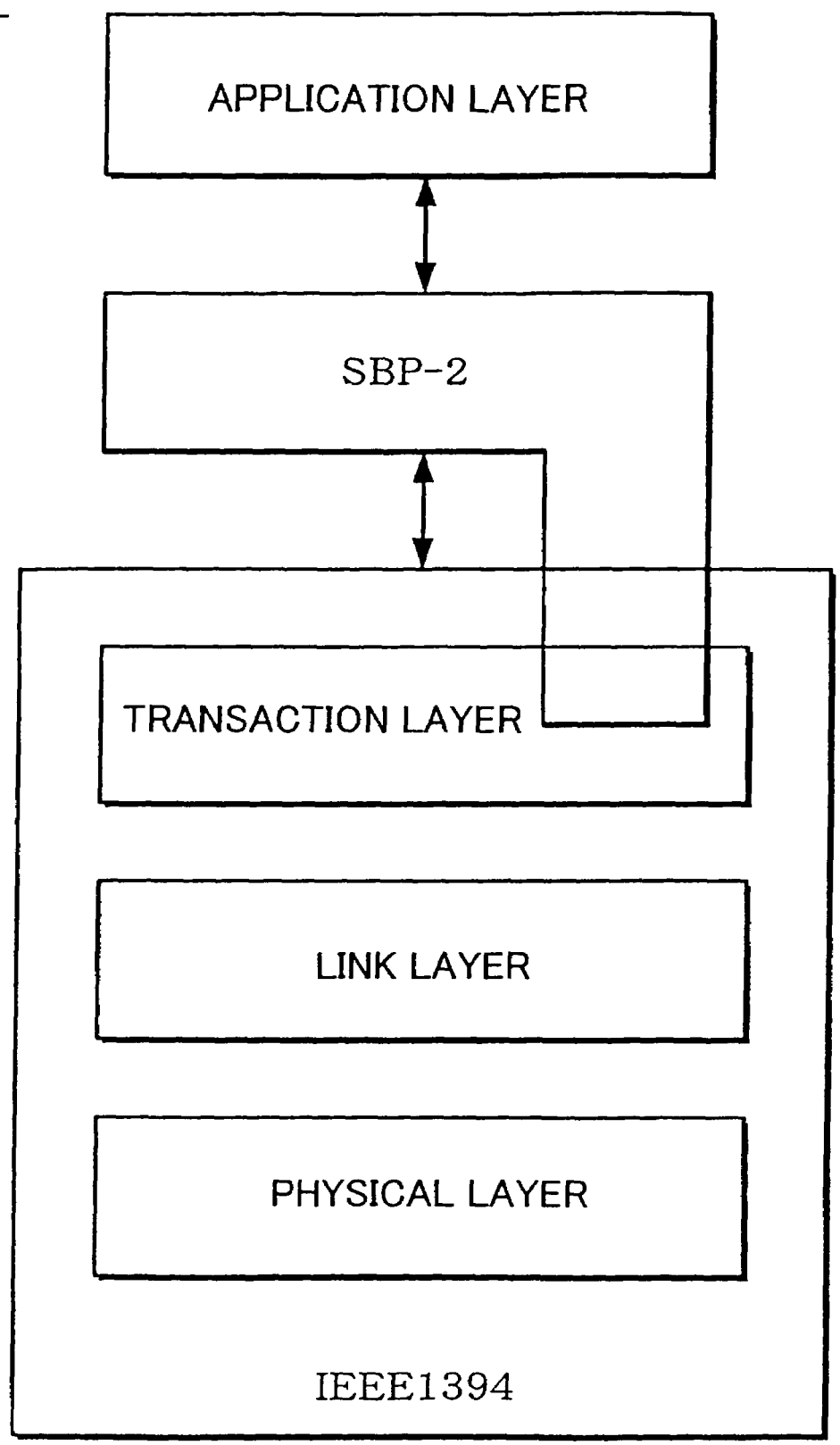
FIG. 1 is illustrative of a layer structure of IEEE 1394 and Serial Bus Protocol 2 (SBP-2).

The IEEE 1394 and SBP-2 layer structure (protocol stack) is shown simplified in FIG. 1.

The protocol for IEEE 1394 (such as IEEE 1394-1995, P1394a, and P1394b) is configured of a transaction layer, a link layer, and a physical layer.

The transaction layer provides an interface (services) in transaction units for upper layers and executes transactions such as read transactions, write transactions, and lock transactions through an interface provided by the lower link layer.

In this case, a read transaction causes the transfer of data from a response node to a request node. A write transaction causes the transfer of data from a request node to a response node. A lock transaction causes the transfer of data from a request node to a response node and returns that data, after it has been processed by the response node, to the request node.

The link layer provides control such as cycle control for addressing, data checking, data framing for packet transfers, and isochronous transfer.

The physical layer provides conversions to electrical signals of logical symbols used by the link layer, bus arbitration, and a physical interface for the bus.

The SBP-2 layer provides an upper-level protocol that comprises some of the functions of the transaction layer under IEEE 1394 (generally speaking: a first interface standard), as shown in FIG. 1.

1.2 SBP-2 Processing

Figure 2:
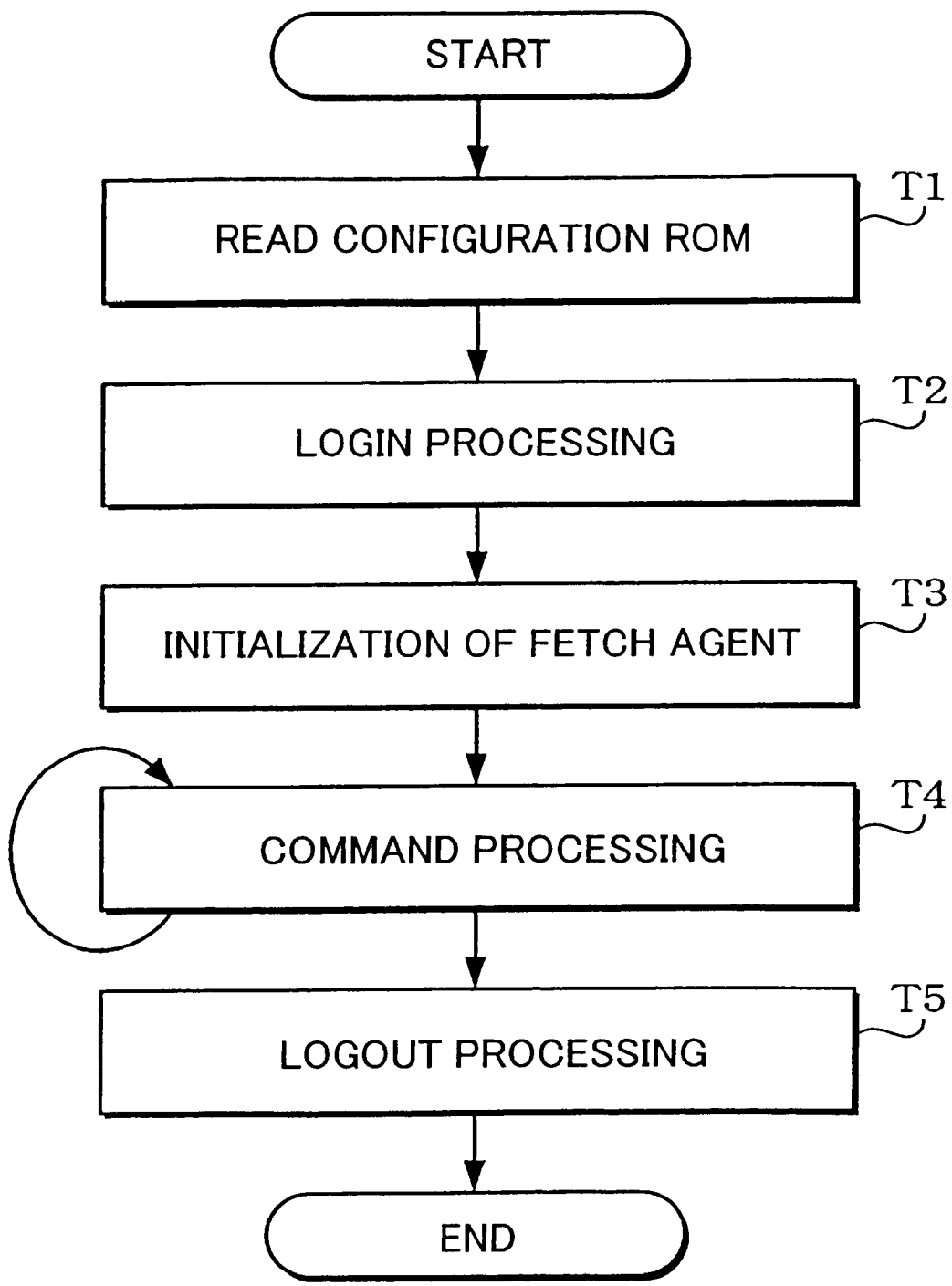
FIG. 2 is illustrative of a summary of the SBP-2 processing.

A flowchart of the entire processing of the SBP-2 (generally speaking: an upper-level first protocol for a first interface standard) is shown in FIG. 2.

As shown in FIG. 2, with SBP-2, configuration ROM information for identifying that the connected device is read first (step T1).

Next, the initiator (such as a personal computer) is asked to log in to acquire the access right (request start permission, or the right to use the bus) with respect to the target (such as a storage device) (step T2). More specifically, login is performed by using a login operation request block (ORB) created by the initiator.

The fetch agent is then initialized (step T3). A command block ORB (normal command ORB) is then used to perform command processing, and finally a logout ORB The data transfer control device 10 comprises physical-layer (PHY) circuitry 14, link-layer circuitry 20, SBP-2 circuitry 22, an interface circuit 30, a buffer management circuit 38, and a packet buffer 40 (data buffer). It also comprises a CPU 42 and the flash memory 44 (EEPROM). A processing module (program) therefore is stored in the flash memory 44, comprising firmware 50 that is executed by the CPU 42 (generally speaking: a processor). Note that the data transfer control device 10 of this embodiment does not necessarily comprise all of the circuit blocks and function blocks shown in FIG. 6; some of them can be omitted. is used for logout processing (step T5).

Figure 3:
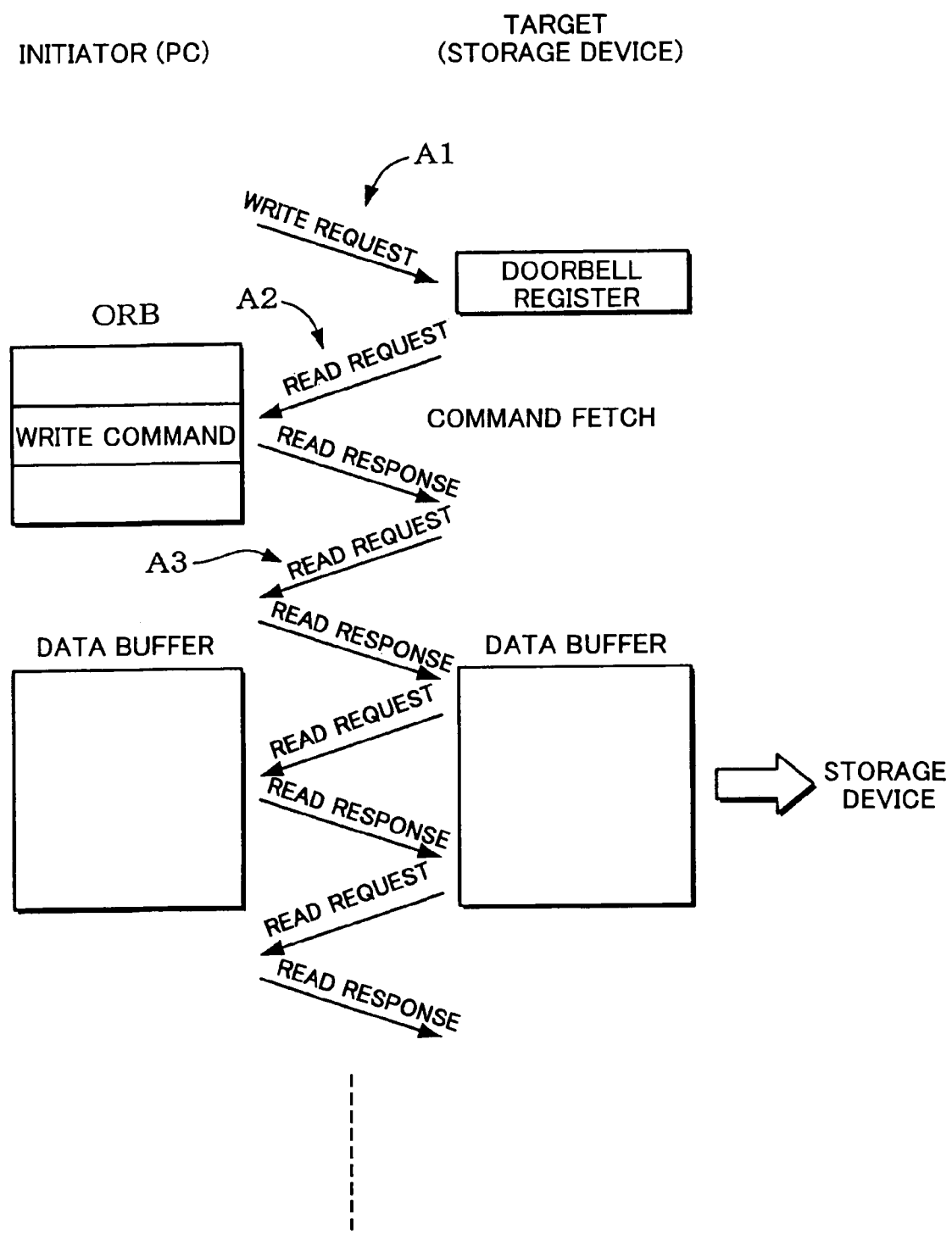
FIG. 3 is illustrative of command processing when data is transferred by SBP-2 from an initiator to a target.

During the command processing of step T4 in this case, the initiator transfers a write request packet (issues a write request transaction) and rings the target's doorbell register, as shown at A1 in FIG. 3. When that happens, the target transfers a read request packet and returns a read response packet corresponding to the initiator, as shown at A2. This causes the fetching of the ORB (command block ORB) created by the initiator into the data buffer (packet buffer) of the target. The target analyzes the command comprised within the thus-fetched ORB.

If the command comprised within the ORB is a SCSI write command, the target transfers the read request packet to the initiator and the initiator returns the corresponding read response packet. This causes the transfer of data that was stored in the data buffer of the initiator to the target. If the target is a storage device, by way of example, the thus-transferred data is written to the storage device.

Figure 4:
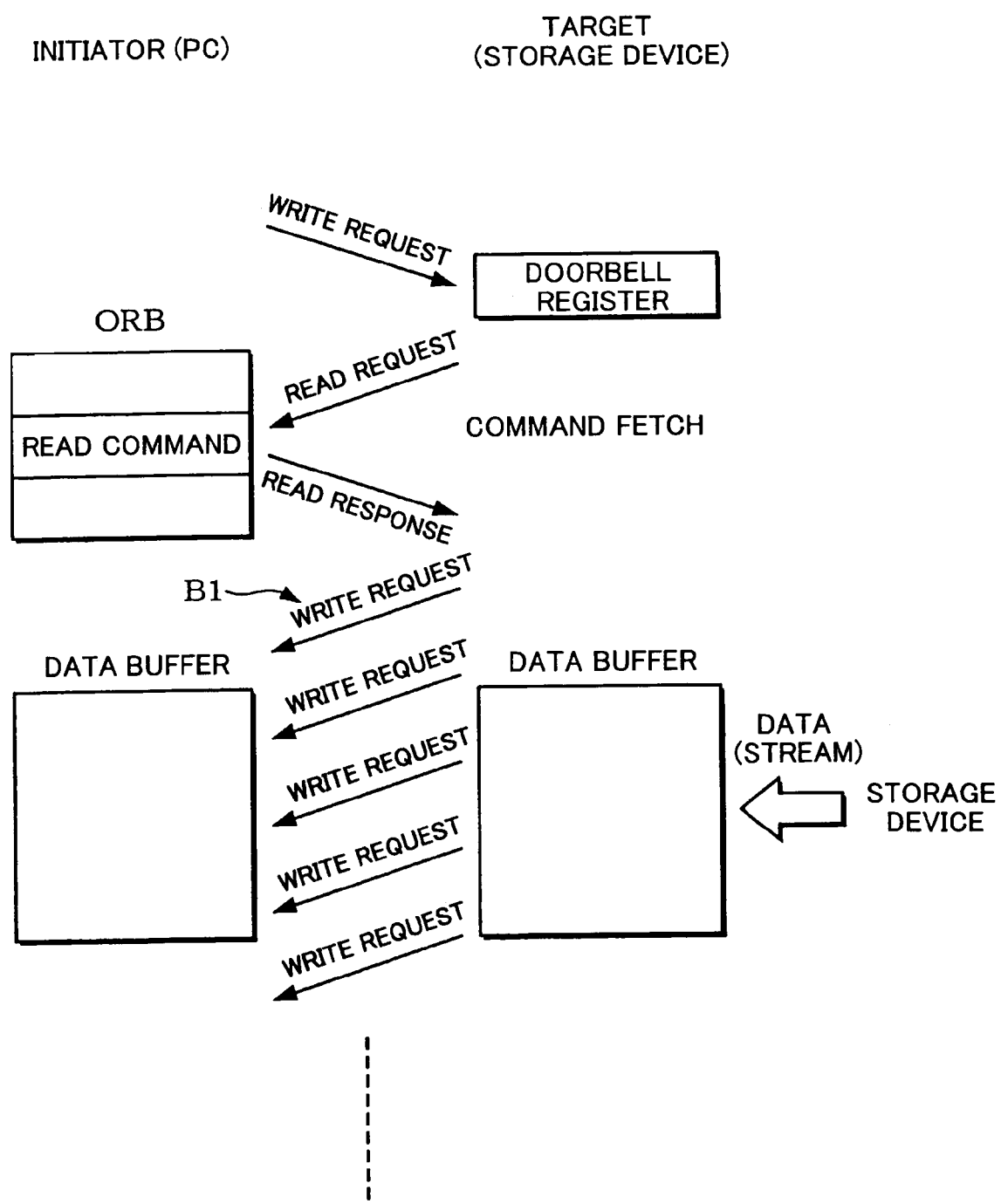
FIG. 4 is illustrative of command processing when data is transferred by SBP-2 from a target to an initiator.

If the command comprised within the ORB is a SCSI read command, on the other hand, the target transfer a series of write request packets to the initiator, as shown at B1 in FIG. 4. If the target is a storage device, by way of example, this causes the transfer of data that has been read out from the storage device, to the data buffer of the initiator.

This SBP-2 makes it possible for the target to transfer a request packet (issue a transaction) whenever its own circumstances are good, to transfer data. Since it is therefore not necessary for the initiator and target to be synchronized, it enables an increase in data transfer efficiency.

Note that optimal AV/C commands have been proposed for the transfer of image and audio data as an upper-level protocol for IEEE 1394, other than SBP-2 optimized for data transfer for storage devices and printers. A protocol called IPover1394 has also been proposed for the transfer of Internet protocol (IP) packets.

1.3 Incorporation into Electronic instrument

A data transfer control device 10 in accordance with this embodiment has a bus bridge function between a BUS1 (a first bus) that conforms to IEEE 1394 (SBP-2) and a BUS2 (a second bus) that conforms to ATA (IDE)/ATAPI, as shown in FIG. 5A. In this case, ATA (AT attachment) is widely used as an interface standard, mainly for hard disks, and ATAPI (ATA packet interface) is an interface standard that enables the use of ATA even in optical disk drives such as CD drives.

The data transfer control device 10 that enables the implementation of the bus bridge function shown in FIG. 5A issues SCSI (MMC-2) commands that comprise ORBs (generally speaking: command packets) for transfer from a PC (host or personal computer, generally speaking: a first device), to a storage device 100 (generally speaking: a second device) as ATAPI commands. It implements data transfer to and from the storage device 100.

By giving the data transfer control device 10 this bus bridge function, it becomes possible for a storage device 100 that is not provided with an ATA/ATAPI to have an IEEE 1394 interface function. This makes it possible to increase the product value of electronic instruments in which the storage device 100 is incorporated.

An electronic instrument 8 in which this storage device 100 is incorporated has to write device information (information that is specific to that electronic instrument or data transfer control device), such as a Global Unique ID (GUID) and configuration ROM information, to a flash memory 44 built into the data transfer control device 10 (LSI chip), by way of example, during manufacture (or at shipping), as shown in FIG. 5B. Once such device information has been written, it is possible to implement appropriate data transfer when the electronic instrument 8 is connected to another electronic instrument. When the SBP-2 (SBP) firmware (generally speaking: a data transfer control program) that controls SBP-2 (IEEE 1394) data transfer is to be corrected, or when the manufacturer of the electronic instrument wishes to access the dedicated SBP-2 firmware therein, it is necessary to update the SBP-2 firmware by writing it to the flash memory 44.

In the case shown in FIG. 5B, SBP-2 data transfer is used to write device information and SBP-2 firmware to the flash memory 44.

More specifically, an EEE 1394 port of a PC at the factory is connected to an IEEE 1394 port of a circuit board 9 mounted on the data transfer control device 10. A command for transferring to a download mode (a mode for writing information to the flash memory 44) from the ordinary operating mode (the usual mode for data transfer) is comprised within an ORB, for transfer from the factory's PC to the data transfer control device 10. When that happens, a rewriter (rewriter section or rewriter module) that writes the information to the flash memory 44 is activated and the device information or SBP-2 firmware is written.

In this FIG. 5B, since SBP-2 transfer is used for writing information to the flash memory 44, it is necessary to perform the transfer over BUS1 with the data transfer control device 10 (the circuit board 9) connected to the storage device 100 (storage unit). This is because information on the storage device 100 is necessary for the SBP-2 transfer but the storage device 100 is not connected and thus it is not possible to obtain this information therefrom. The target of the PC system's identification is always the storage device 100 because the data transfer control device 10 is merely a device having the bus bridge function.

For that reason, the method shown in FIG. 5B necessitates that the device information must be written after the fabrication step of connecting the storage device 100 to the circuit board 9 on which the data transfer control device 10 is mounted. It is thus not possible to write the device information during the first part of the fabrication process, leading to problems such as an increase in the complexity and length of the fabrication process and an increase in the cost of the electronic instrument.

To ensure that this embodiment resolves the above-described problems, a data transfer control device of the configuration described below is employed.

2. Overall Configuration

Figure 6:
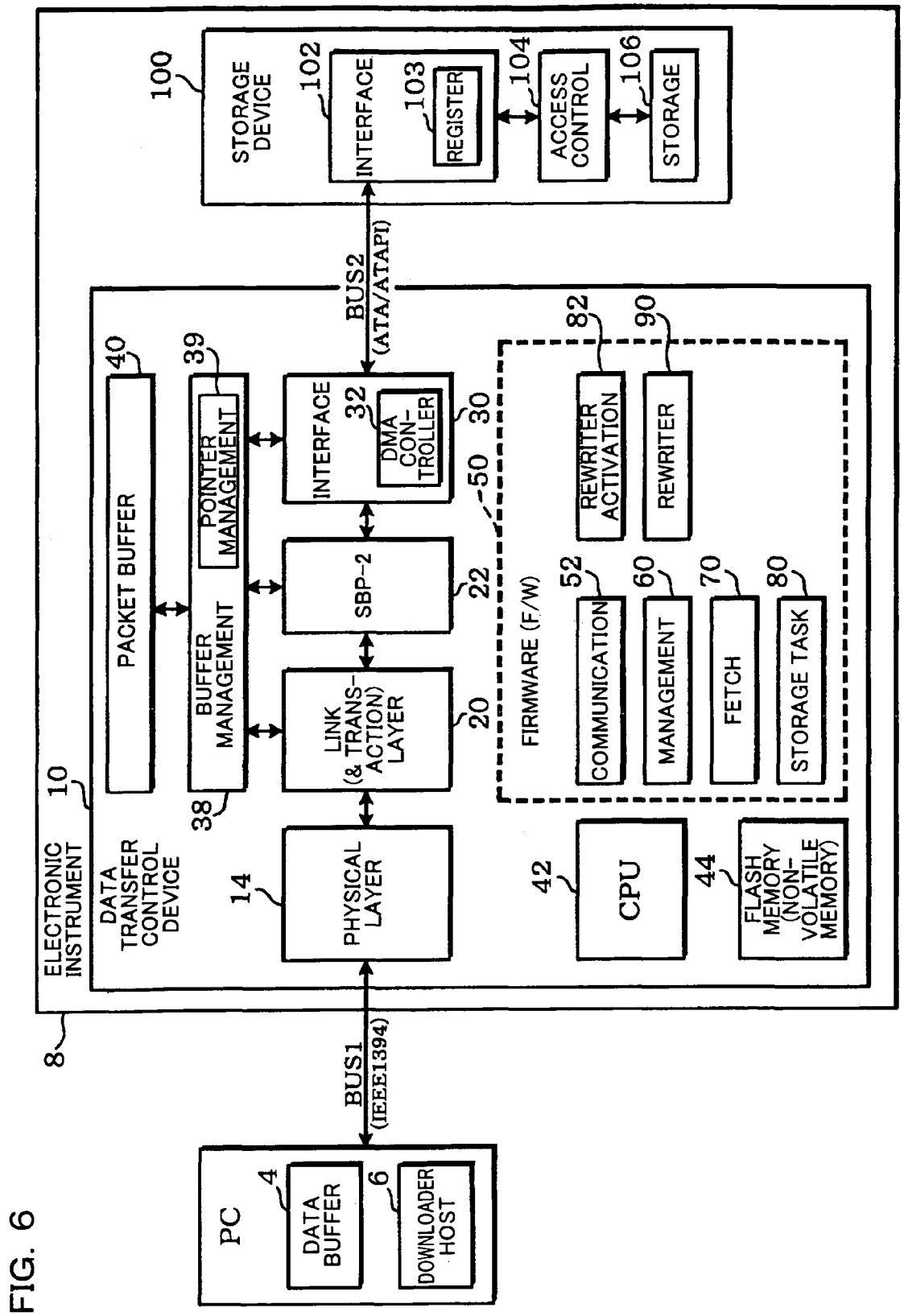
FIG. 6 shows an example of the configuration of the data transfer control device and an electronic instrument in accordance with one embodiment of the present invention.

An example of the overall configuration of the data transfer control device of this embodiment and the electronic instrument that incorporates it is shown in FIG. 6. Note that in the description below, the target that transfers data with respect to the initiator is exemplified as a storage device (such as a CD drive, DVD drive, or hard disk drive), but it should be obvious to those skilled in the art that the present invention is not limited thereto.

A PC (host or personal computer, generally speaking: a first device) having a data buffer 4 and the electronic instrument 8 are connected by a BUS1 (first bus) conforming to IEEE 1394. The electronic instrument 8 has the data transfer control device 10 and the storage device 100 (generally speaking: a second device).

Note that the electronic instrument 8 could also comprise other components such as a system CPU, system memory (ROM, RAM), an operating section, or a signal processing device (not shown in the figure).

The PC also comprises a downloader host section 6 that functions as a device driver for the operating system (OS). This downloader host section 6 is implemented by the CPU of the PC and a downloader host program (downloader host module). This downloader host program (driver kit) can be supplied through an information storage medium (CD or DVD) that can be read by the PC, or through the Internet (communications lines).

The data transfer control device 10 comprises physical-layer (PHY) circuitry 14, link-layer circuitry 20, SBP-2 circuitry 22, an interface circuit 30, a buffer management circuit 38, and a packet buffer 40 (data buffer). It also comprises a CPU 42 and the flash memory 44 (EEPROM). A processing module (program) therefore is stored in the flash memory 44, comprising firmware 50 that is executed by the CPU 42 (generally speaking: a processor). Note that the data transfer control device 10 of this embodiment does not necessarily comprise all of the circuit blocks and function blocks shown in FIG. 6; some of them can be omitted.

The physical-layer circuitry 14 is designed to implement the physical-layer protocol of FIG. 1 in hardware, and it has the function of converting the logical symbols used by the link-layer circuitry 20 into electrical signals.

The link (and transaction)-layer circuitry 20 is designed to implement the link-layer protocol and part of the transaction-layer protocol of FIG. 1 in hardware, and provides various services for packet transfer between nodes.

These functions of the physical-layer circuitry 14 and the link-layer circuitry 20 make it possible to perform data transfer that conforms to IEEE 1394 to and from a PC (generally speaking: an electronic instrument) through BUS1 (the first bus).

The SBP-2 circuitry 22 (transfer execution circuitry) is designed to implement part of the SBP-2 protocol and part of the transaction layer in hardware. These functions of the SBP-2 circuitry 22 make it possible to divide transfer data into a series of packets and transfer the thus-divided series of packets continuously.

The interface circuit 30 is designed to provide an interface with the storage device 100. This function of the interface circuit 30 makes it possible to perform data transfer that conforms to ATA (AT attachment) or ATAPI (ATA packet interface) to and from the storage device 100 through BUS2 (the second bus).

The provision of the physical-layer circuitry 14, the link-layer circuitry 20, and the interface circuit 30 makes it possible for the data transfer control device 10 to have a bus bridge function for IEEE 1394 (generally speaking: a first interface standard) and ATA (IDE)/ATAPI (generally speaking: a second interface standard).

A DMA controller 32 comprised by the interface circuit 30 enables direct memory access (DMA) transfer to and from the storage device 100 through BUS2.

Note that the storage device 100 connected to BUS2 comprises an interface circuit 102 for performing data transfer conforming to ATA (IDE)/ATAPI, an access control circuit 104 for controlling access (write or read access control) to storage 106, and the storage 106 such as an optical disk or hard disk.

The buffer management circuit 38 manages the interface with the packet buffer 40. The buffer management circuit 38 comprises components such as a register for controlling the buffer management circuit 38, an arbitration circuit that arbitrates connections of the packet buffer 40 to the bus, and a sequencer that generates various control signals.

The buffer management circuit 38 also comprises a pointer management section 39. This pointer management section 39 manages pointers of the packet buffer 40 by a ring buffer method, and updates a plurality of pointers for writing and reading.

The packet buffer 40 (packet memory or data buffer) is a buffer for storing packet (transfer data) temporarily, which is configured of hardware such as SRAM, SDRAM, or DRAM. Note that in this embodiment, the packet buffer 40 functions as a packet storage section that can be randomly accessed. The packet buffer 40 could also be connected externally instead of being incorporated into the data transfer control device 10.

The CPU 42 (generally speaking: a processor) controls the entire device and also controls data transfer.

The flash memory 44 (EEPROM) is non-volatile memory containing data that can be overwritten electrically. Processing modules (programs) for the firmware 50 are stored in this flash memory 44.

The firmware 50 is a program comprising various processing modules (processing routines) that run on the CPU 42, and the protocols for layers such as the transaction layer are implemented by this firmware 50 and the CPU 42 or the like that is hardware.

The firmware 50 (F/W) comprises a communications section 52, a management section 60, a fetch section 70, a storage task section 80, a rewriter activation section 82, and a rewriter (downloader) section 90. Note that the firmware 50 does not necessarily comprise all of these function blocks (modules); some of them could be omitted.

In this case, the communications section 52 is a processing module that functions as an interface between hardware such as the physical-layer circuitry 14 and the link-layer circuitry 20.

The management section 60 (management agent) is a processing module that provides management of tasks such as login, reconnection, logout, and reset. If the initiator has requested login at a target, for example, this management section 60 first accepts this login request.

The fetch section 70 (fetch agent) is a processing module that receives operation request blocks (ORBs), issues statuses, and handles command processing requests to the storage task section 80. The fetch section 70 differs from the management section 60, which can only handle a single request, in that it also can handle an ORB link list that it itself has fetched in accordance with a request from the initiator.

The storage task section 80 is a processing module for executing the processing of commands comprised by ORBs and DMA transfers.

The rewriter activation section 82 (rewriter activation module) performs processing to cause a rewriter section 90 to start processing.

More specifically, if it has been detected that the storage device 100 (generally speaking: a device) is disconnected from BUS2, the rewriter activation section 82 automatically causes the processing of the rewriter section 90 (download mode) to start. The processing of the rewriter section 90 is started even if a download start command has been received from the downloader host section 6 of the PC.

Note that if the storage device 100 has been detected connected to BUS2, the SBP-2 processing (ordinary operating mode) is started. This SBP-2 processing is implemented by components such as the communications section 52, the management section 60, the fetch section 70, and the storage task section 80.

The detection of whether or not the storage device 100 is connected to BUS2 can be determined based on the result of an access (at least one of a write result and a read result) to a register 103 (ATA register) of the storage device 100, by way of example. Note that a monitor circuit (detection circuit) that monitors the state of BUS could be provided, and this monitor circuit can be used to detect whether or not the storage device 100 is connected to BUS2.

The rewriter section 90 (downloader section and rewriter module) performs processing to write (overwrite) information to the flash memory 44 (generally speaking: a non-volatile memory).

More specifically, the rewriter section 90 downloads (or loads) information that is transferred through BUS1, to write information to the rewrite area (a storage area where the rewriter section 90 can write information) of the flash memory 44 for storing device information such as a GUID (generally speaking: device-specific identification information for an electronic instrument), config ROM information, and data transfer control program information (program information for firmware that implements SBP-2 transfer processing). It then writes that information (device information or data transfer control program information) to the rewrite area.

In such a case, the downloading of information to the rewrite area is implemented by data transfer (under EEEE 1394) executed by the processing of the downloader host section 6 of the PC and the storage task section 80.

3. Memory Map

Figure 7:
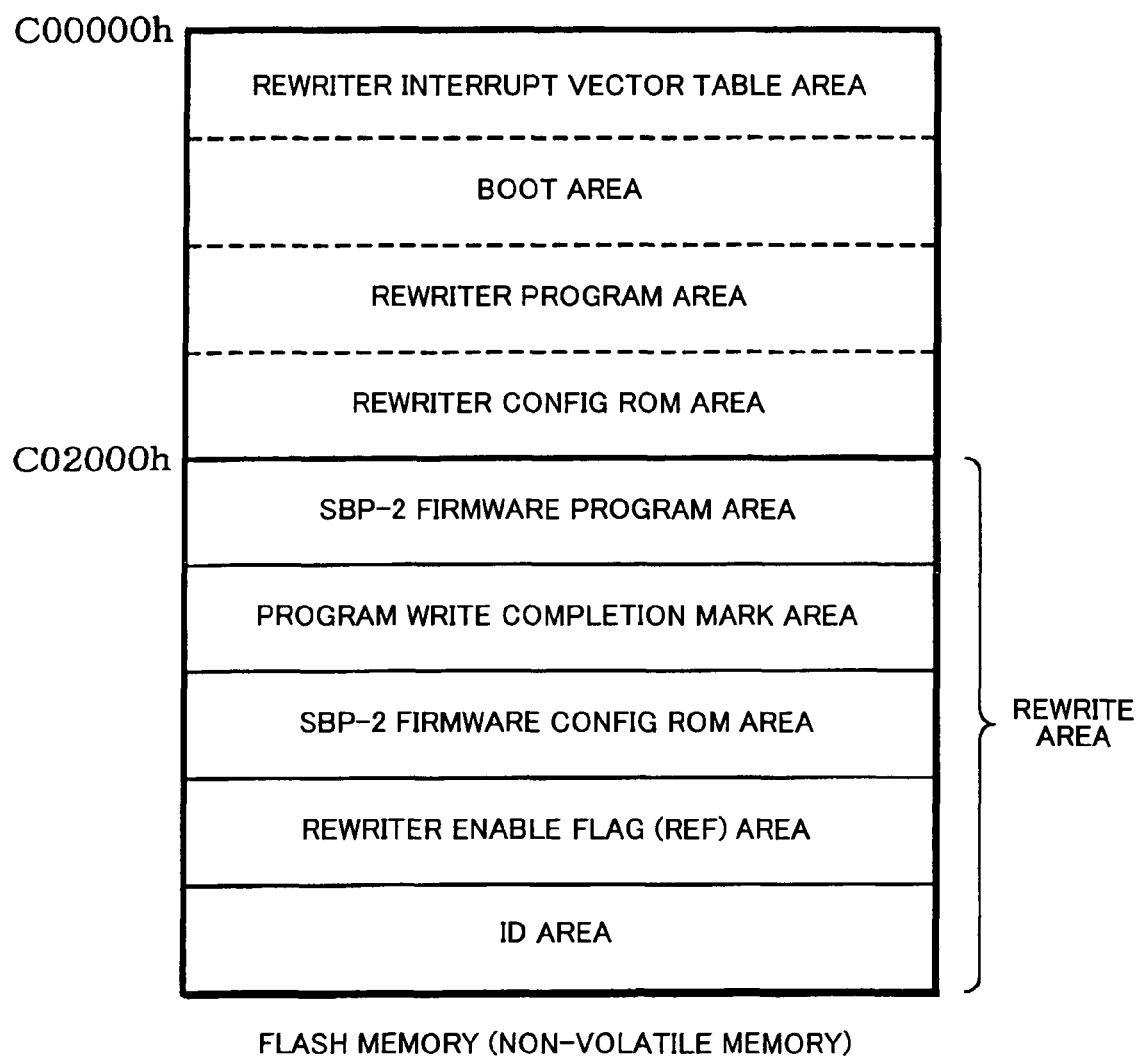
FIG. 7 is a memory map of the flash memory (non-volatile memory).

A typical memory map of the flash memory 44 (non-volatile memory) is shown in FIG. 7.

A vector table that is necessary for the interrupt processing of the rewriter section 90 is stored in a rewriter interrupt vector table area. Information for boot processing is stored in the boot area. Execution codes of the rewriter program are stored in the rewriter program area. Config ROM information for identifying that the data transfer control device 10 is a test device is stored in the rewriter config ROM area.

Execution codes of the SBP-2 firmware program are stored in the SBP-2 firmware program area. An interrupt vector table for the SBP-2 firmware is stored at the start of this area.

A program write completion mark is stored in the program write completion mark area. This mark is used to indicate whether the program has been written normally to the SBP-2 firmware program area (generally speaking: information indicating whether or not the data transfer control program information has been written normally to the rewrite area).

Config ROM information for the SBP-2 firmware is written to the SBP-2 firmware config ROM area.

A rewriter enable flag (generally speaking: rewriter processing setting information for setting the rewriter to either enabled or disabled) is stored in the rewriter enable flag area. When the rewriter enable flag (hereinafter abbreviated to REF when suitable) is disabled, the data transfer control device 10 shifts to ordinary operating mode (SBP-2 processing mode), and when it is enabled it shifts to download mode (rewriter processing mode).

An ID (GUID) such as a vendor ID or serial ID is stored in the ID area. If the PC writes config ROM information to the SBP-2 firmware config ROM area, the configuration is such that the ID information stored in the ID area is embedded in the config ROM. If a PC reads the ID, the ID within that config ROM is returned to the PC.

The SBP-2 firmware program area, the program write completion mark area, the SBP-2 firmware config ROM area, the rewriter enable flag area, and the ID area are rewrite area into which information can be written by the rewriter section 90. In other words, the rewriter section 90 performs data transfer from the downloader host section 6 of the PC when in download mode, enabling it to download information from the PC into the rewrite area and write the information therein.

4. Detailed Processing

Figure 8:
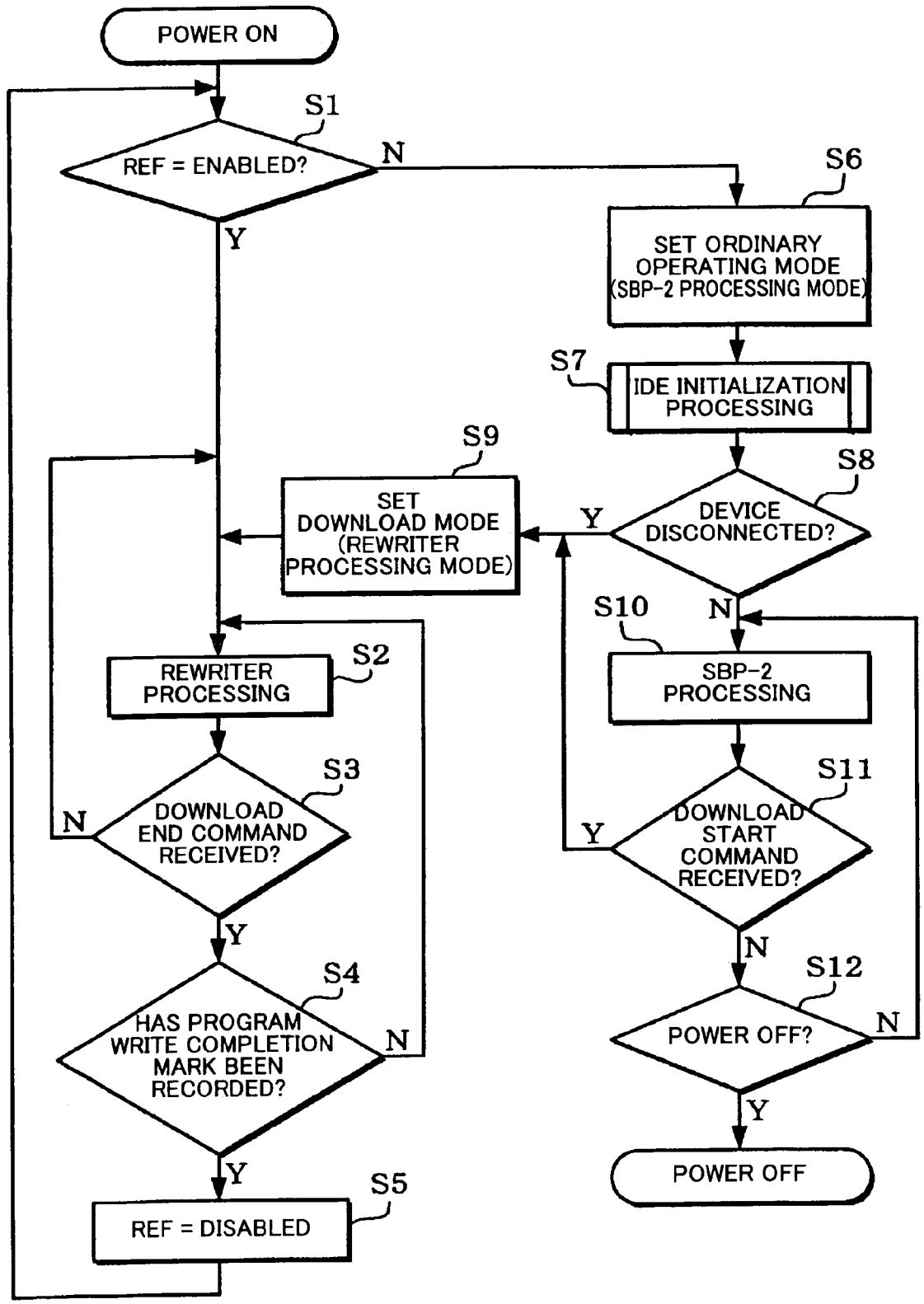
FIG. 8 is a flowchart showing a detailed example of the processing according to one embodiment of the present invention.
Figure 9:
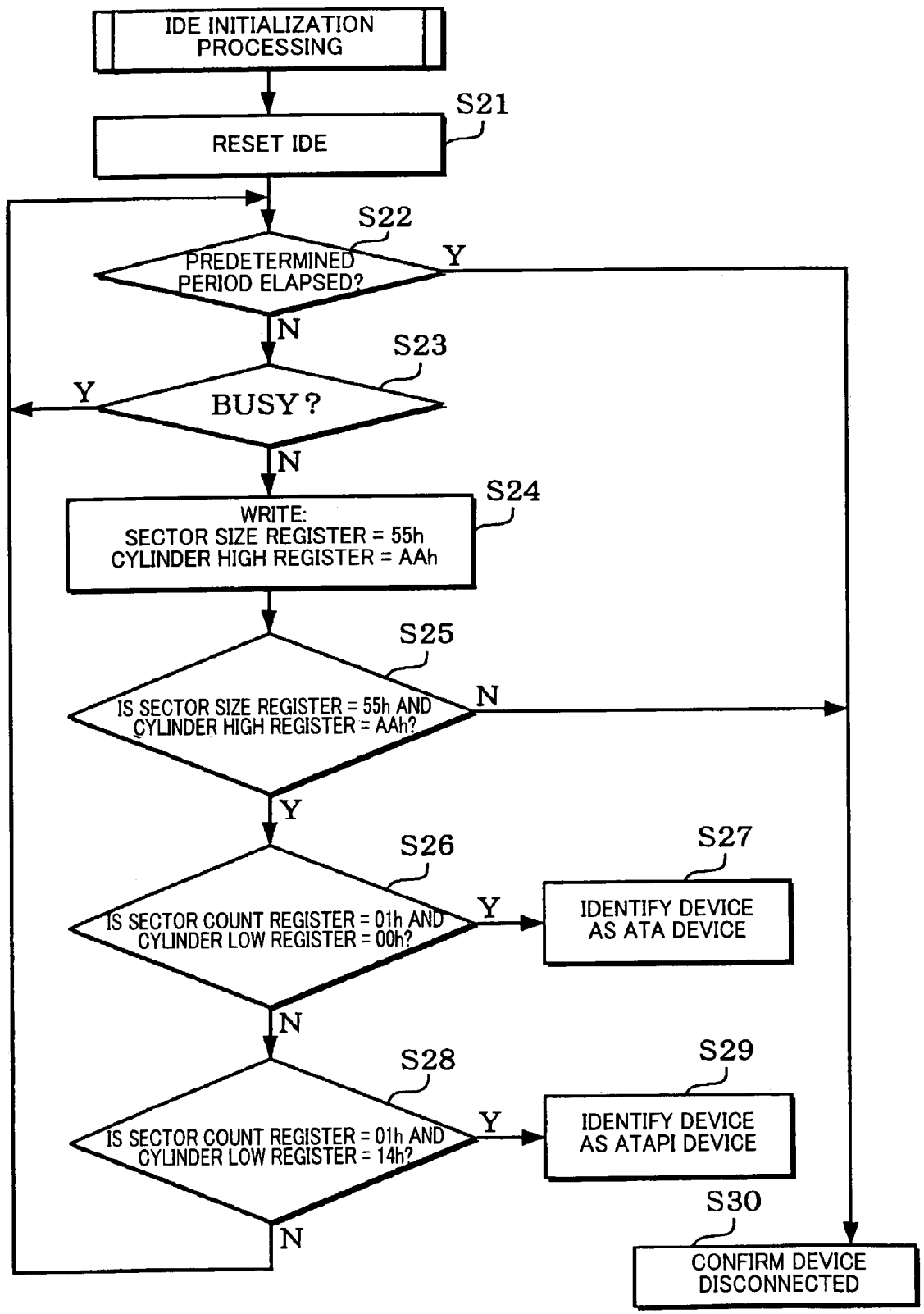
FIG. 9 is another flowchart showing a detailed example of the processing according to one embodiment of the present invention.

The description now turns to the processing of the data transfer control device of this embodiment, with reference to the flowcharts of FIGS. 8 and 9.

When the power source of the data transfer control device 10 is turned on (at reboot or reset), the system determines whether or not the rewriter enable flag REF (see FIG. 7) is enabled (step S1). More specifically, the CPU 42 of FIG. 6 starts processing from the address C00000h of FIG. 7 (the boot address), when the power is turned on. Since the address of a program (start-up program) that checks REF is stored at C00000h, this makes it possible to check whether or not REF is enabled.

If REF is enabled, the processing shifts to rewriter processing (download mode) (step S2). The download end command is received from the downloader host section 6 of the PC and, if the program has been written correctly, the program write completion mark is recorded (step S3). If the program write completion mark has been recorded (step S4), REF is set to disabled (step S5) and the flow returns to step S1. If the program write completion mark has not been recorded, on the other hand, the flow returns to step S2.

Note that if REF is set to enabled in the initial state, steps S6, S7, S8, and S9 could be omitted in the first round of rewriter processing.

If REF is disabled in step S1, the ordinary operating mode (SBP-2 processing mode) is set (step S6). More specifically, the vector table address is set to C02000h, as shown in FIG. 7. Initialization processing for IDE (ATA/ATAPI) is then performed (step S7).

During the IDE initialization processing, whether or not the storage device 100 is disconnected from BUS2 is detected and, if it is disconnected (step S8), download mode (rewriter processing mode) is set (step S9). Specifically, the address in the vector table is set to C00000h, as shown in FIG. 7. The system shifts to rewriter processing (step S2) and the processing of the rewriter section 90 starts (the rewriter program is activated).

If it is determined in step S8 that the storage device 100 is not disconnected, on the other hand, the system shifts to SBP-2 processing (ordinary operating mode) (step S10), and ordinary data transfer control processing is performed, based on the SBP-2 protocol. If a download start command is received from the downloader host section 6 of the PC (step S11), rewriter mode is set (step S9), and the system shifts to rewriter processing (step S2). If no download start command is received, on the other hand, the system determines whether or not the power is off (step S12) and, if the power is not off, the flow returns to step S10.

FIG. 9 is a flowchart of the IDE initialization processing (initialization of the storage device 100) of step S7 of FIG. 8.

First of all, IDE (ATA/ATAPI) reset processing is performed (step S21). The system then determines whether or not a predetermined period (such as 1 minute) has elapsed (step S22). If it has not elapsed, it determines whether or not the storage device 100 is busy (step S23) and, if it is busy the flow returns to step S22. In that case, the determination of whether or not it is busy can be done by checking a BSY bit in an ATA status register shown in FIG. 10A.

Note that this status register is comprised within the register 103 of the storage device 100 of FIG. 6. In addition, a sector size register, a cylinder high register, a sector count register, and a cylinder low register, which will be described later, are also comprised within the register 103. The values in these registers can be read out by using ATA PIO transfer through BUS2, as will be described later. In addition, the values of these registers can be displayed on a PC by using registers in the data transfer control device 10.

If the storage device 100 is not busy, the system writes 55h and AAh to the sector size register and cylinder high register, respectively, of the data transfer control device 10 (step S24). It then reads the sector size register and the cylinder size register, to confirm whether or not 55h and AAh have been written therein (step S25).

It next determines whether or not the values in the sector count register and the cylinder low register match 01h and 00h (step S26). If they do match, it identifies that the storage device 100 is an ATA device (step S27). This is because the values of the sector count register and the cylinder low register ought to be those as shown in FIG. 10B for a device that conforms to ATA (such as a hard disk drive).

The system then determines whether or not the values of the sector count register and the cylinder low register match 01h and 14h, respectively (step S28). If they do match, it identifies that the storage device 100 is an ATAPI device (step S29), but if they do not match the flow returns to step S22. This is because the values of the sector count register and the cylinder low register ought to be those as shown in FIG. 10C for a device that conforms to ATAPI (such as a CD drive or DVD drive).

With this embodiment, confirmation that the device is disconnected occurs when it is determined in step S22 that a predetermined period has elapsed or when it is determined in step S25 that a suitable value has not been written (step S30).

The method that is employed with this embodiment as described above is such that whether or not the device is disconnected (not detected) is determined based on the result of an access (write or read access) to the register 103 of the storage device 100. This processing for access to the register 103 (processing that identifies whether it is an ATA device or an ATAPI device) is processing that is necessary for the initialization of the storage device 100. The use of this method therefore has the advantage of enabling detection of whether or not the device is disconnected, in addition to the necessary minimum processing.

Note that the detection of whether or not the device is disconnected could also be implemented by providing hardware circuitry that monitors the state of a predetermined signal line of BUS2. If there is a signal line on the storage device 100 side that is either pulled up or pulled down, by way of example, it is possible to detect whether or not the device is disconnected by monitoring the voltage level of that signal line.

5. Method of Fabricating Electronic Instrument

Use of the above-described data transfer control device this embodiment makes it possible to implement a simplification and shortening of the process of fabricating an electronic instrument.

With this embodiment as shown in FIG. 11A, for example, the data transfer control device 10 (the IEEE 1394 port of the circuit board 9) is connected to the factory's PC (the PC's IEEE 1394 port) by BUS1 in a state in which the storage device 100 is disconnected from BUS2.

If the power of the data transfer control device 10 is turned on in this state and the initial state is such that REF is set to enabled, the system shifts to download mode and rewriter processing starts (the rewriter program in the flash memory 44 is activated). If the program is written normally, REF is set to disabled (step S5 of FIG. 8). If the power of the data transfer control device 10 is temporarily turned off then on again in a similar state, it is determined at step S8 of FIG. 8 that the device is disconnected, the system shifts automatically to download mode and rewriter processing starts, as shown in steps S9 and S2 (the rewriter program in the flash memory 44 is activated).

This rewriter processing causes data transfer through BUS1 so that the device information such as the GUID or configuration ROM information, or information for the SBP-2 firmware (data transfer control program) is downloaded and written to the rewrite area of FIG. 7, as shown in FIG. 11A. This makes it possible to store device-specific information for identifying the electronic instrument 8 in the flash memory 44. Alternatively, SBP-2 firmware that is specific to each environmental information manufacturer can be stored in the flash memory 44.

Afterwards, the data transfer control device 10 (the circuit board 9) is connected to the storage device 100, as shown in FIG. 11B. This data transfer control device 10 (the circuit board 9) and the storage device 100 are incorporated in the electronic instrument. This completes the electronic instrument 8 as shown in FIG. 12A.

When the user uses the electronic instrument 8, it is in a state in which the storage device 100 is connected to BUS2, as shown in FIG. 12B. It is therefore detected at step S8 of FIG. 8 that the device is not disconnected, so ordinary SBP-2 processing (ordinary operating mode) is performed. This makes it possible to implement ordinary data transfer in which data (write data) transferred from a domestic PC (host) through BUS1 is transferred (written) to the storage device 100 (device) through BUS2. It is also possible to implement data transfer in which (read data) that is transferred from the storage device 100 through BUS2 is transferred (read into) the PC through BUS1. In other words, use of the data transfer control device 10 makes it possible to implement a bus bridge function between BUS1 (IEEE 1394) and BUS2 (ATA, ATAPI), enabling an IEEE 1394 interface function for the electronic instrument 8.

With this embodiment, information is written to the flash memory 44 during the fabrication process before the storage device 100 is connected to the data transfer control device 10 (the circuit board 9), unlike in the method shown in FIG. 5B. Even with transfer initiated by a download start command from the PC, the system shifts automatically to download mode if the device is disconnected, activating the rewriter processing. It is therefore possible to simplify and shorten the fabrication process, as well as enabling a reduction in manual labor. In this case, by setting REF to enabled in the initial state, the processes of steps S6, S7, S8, and S9 of FIG. 8 can be omitted during the first transition to download mode, enabling a further shortening of the fabrication process.

6. Rewriter Processing (Download Processing)

The description now turns to details of the rewriter processing.

Figure 13:
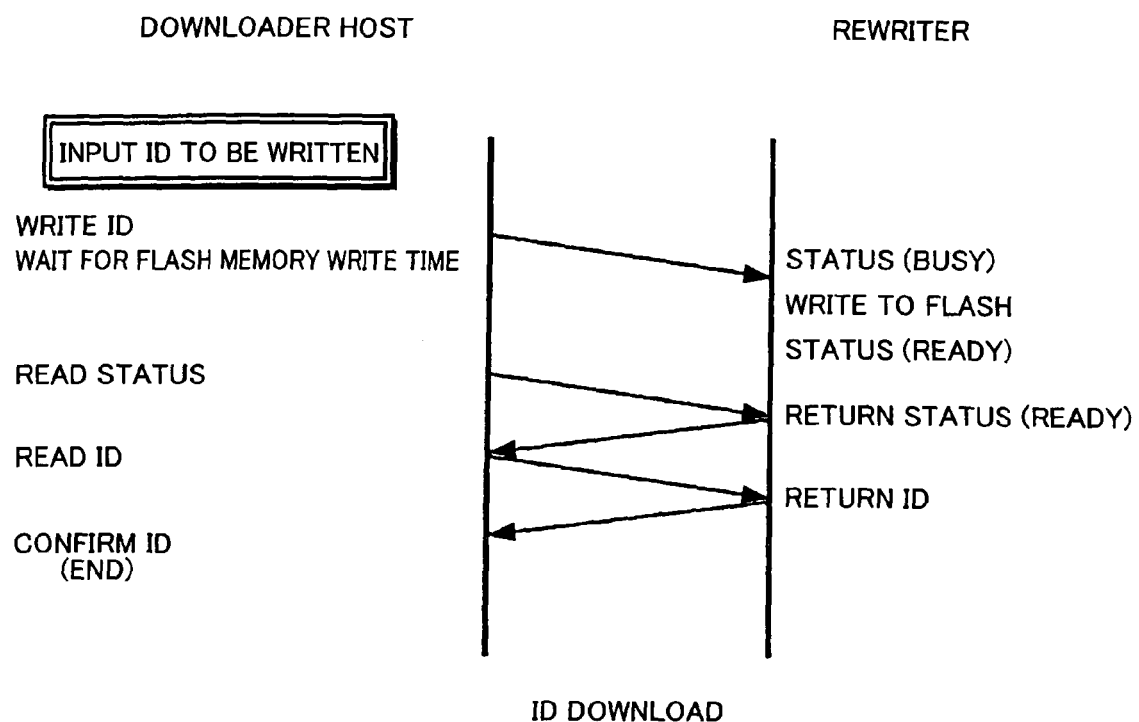
FIG. 13 is illustrative of ID download processing.

An illustrative view of ID (GUID) download processing is shown in FIG. 13.

First of all, when the downloader host section 6 executes an ID write, the rewriter section 90 writes that ID to the flash memory 44. When the downloader host section 6 then executes a status read, the rewriter section 90 returns the status. The downloader host section 6 subsequently reads the ID and confirms whether or not the ID has been written appropriately, and the processing ends.

Figure 14:
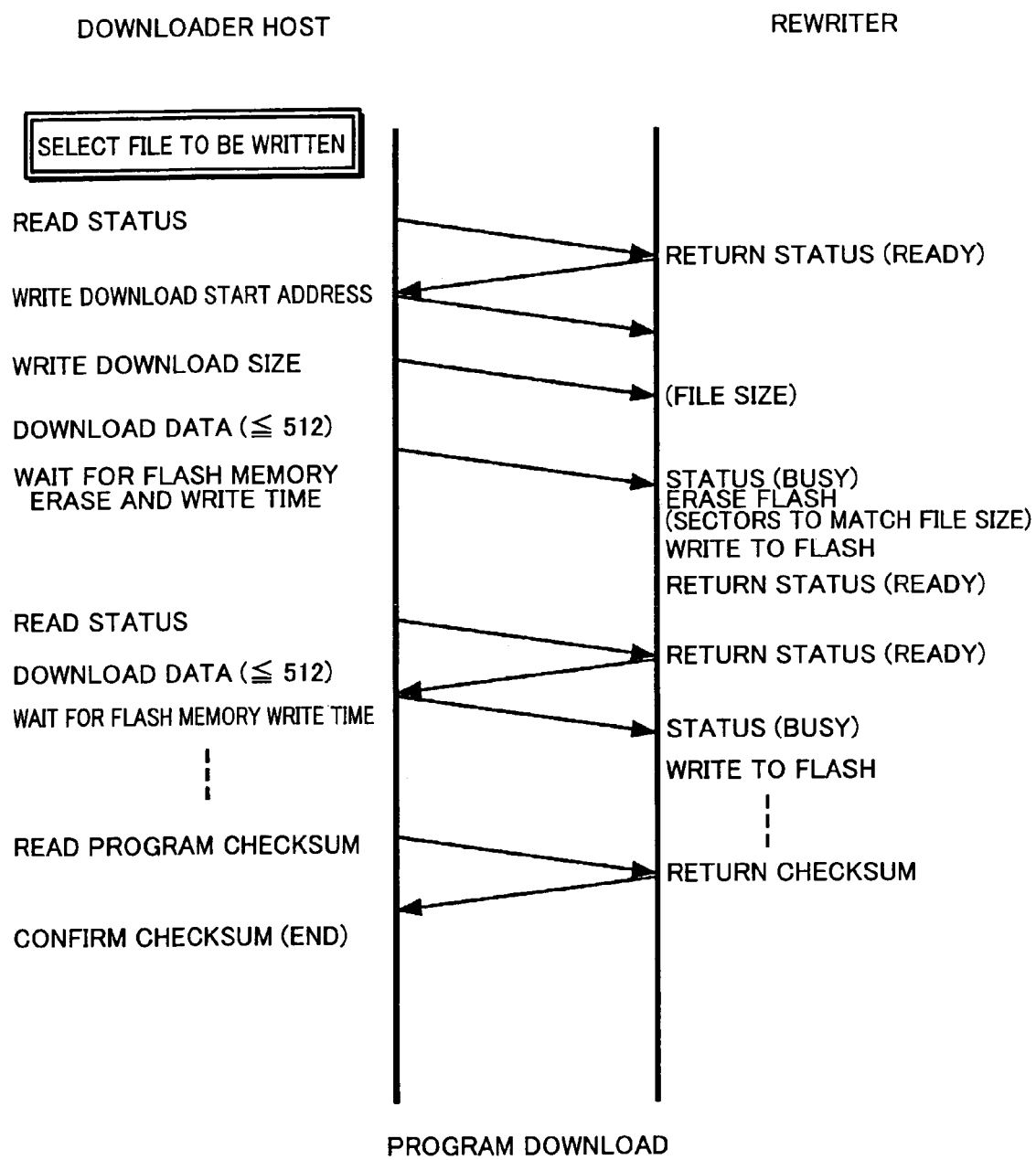
FIG. 14 is illustrative of program download processing.

An illustrative view of program (SBP-2 firmware) download processing is shown in FIG. 14.

First of all, when the downloader host section 6 executes a status read, the rewriter section 90 returns the status. The downloader host section 6 then writes the download start address and the download size. If the downloader host section 6 then executes a write of download data (program information for the SBP-2 firmware) in 512-byte units (512 bytes or less), the rewriter section 90 writes that download data to the flash memory 44. When the writing of the download data ends, the downloader host section 6 executes a read of the program checksum and the rewriter section 90 returns the checksum. The downloader host section 6 subsequently confirms whether or not the checksum is appropriate, and the processing ends.

Figure 15A:
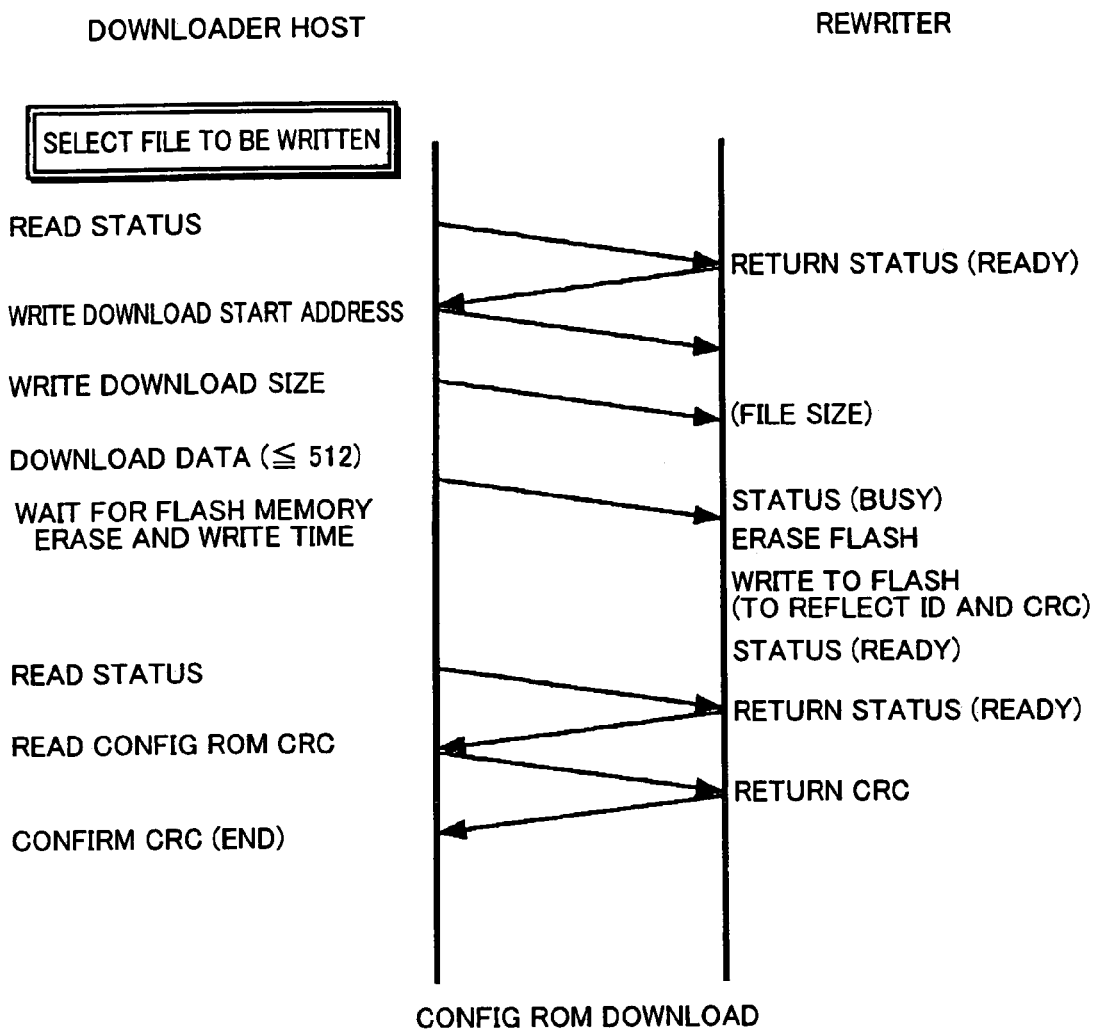
FIGS. 15A and 15B are illustrative of config ROM download processing and download end processing.

An illustrative view of config ROM information download processing is shown in FIG. 15A.

First of all, when the downloader host section 6 executes a status read, the rewriter section 90 returns that status. The downloader host section 6 then executes a write of the download start address and the download size. If the downloader host section 6 then executes a write of download data (config ROM information) in 512-byte units (512 bytes or less), the rewriter section 90 writes that download data to the flash memory 44. During this time, details such as the previously written ID are still reflected in the config ROM. When the writing of the downloaded data ends, the downloader host section 6 executes a status read and the rewriter section 90 returns the status. When the downloader host section 6 then executes a read of the CRC for the config ROM, the rewriter section 90 returns the CRC and the processing ends.

Figure 15B:
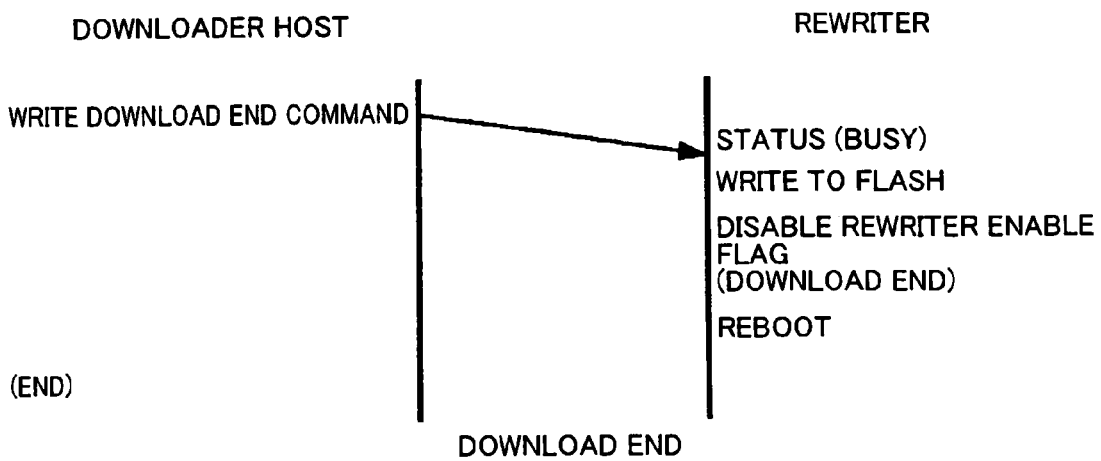

An illustrative view of download end processing is shown in FIG. 15B.

When the downloader host section 6 executes a write of the download end command, the rewriter section 90 disables the rewriter enable flag REF, sets the status to download end, and performs reboot processing.

7. ATA/ATAPI Interface Circuit

Figure 16:
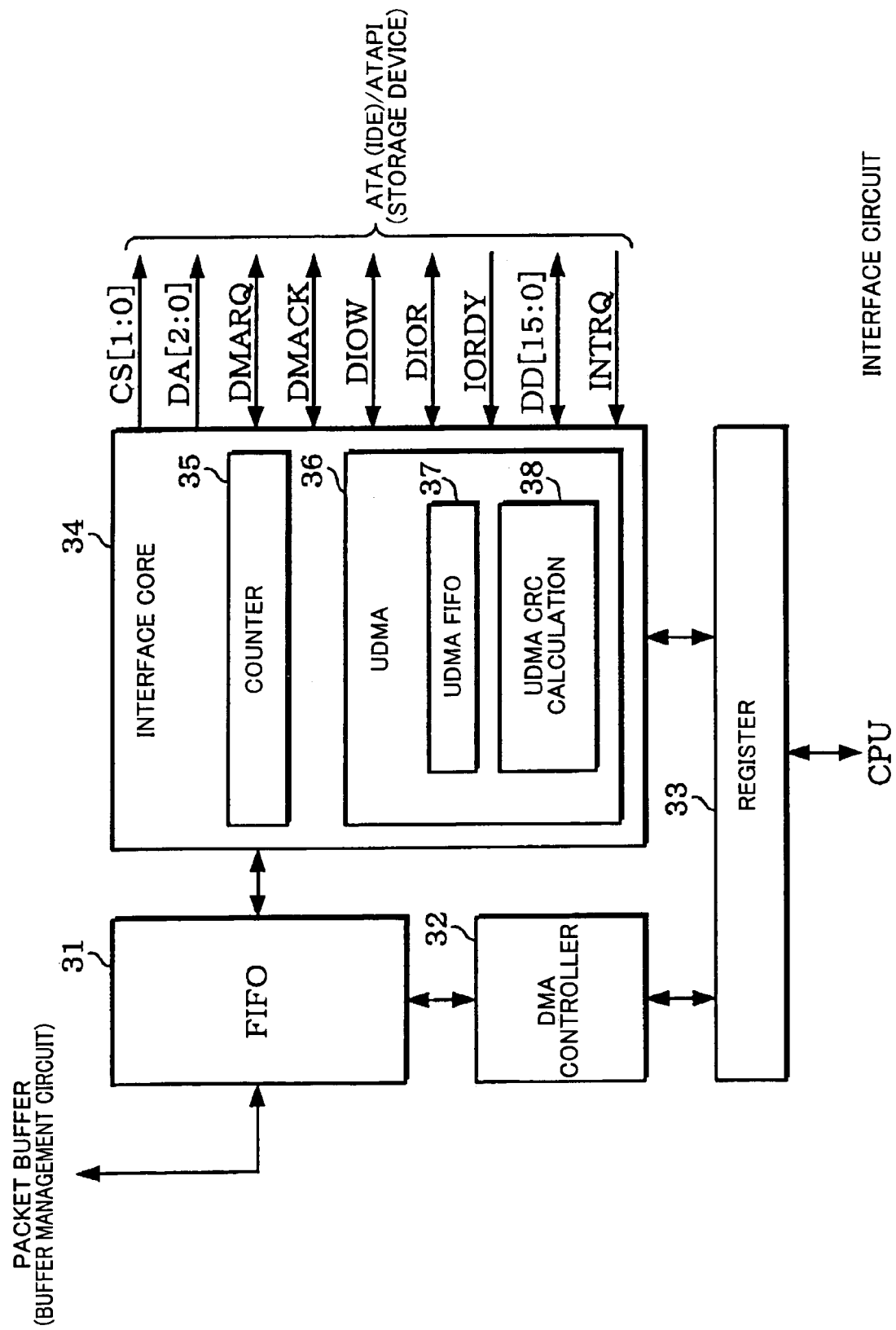
FIG. 16 shows an example of the configuration of the Advanced Technology Attachment/Advanced Technology Attachment Packet Interface (ATA/ATAPI) interface circuit.

An example of the configuration of the interface circuit 30 for ATA/ATAPI is shown in FIG. 16. Note that the interface circuit 30 need not necessarily be provided with all the circuit blocks shown in FIG. 16; some of them can be omitted A FIFO 31 is a buffer for adjusting (buffering) any differences in the data transfer rate. The DMA controller 32 is a circuit for controlling (REQ/ACK control) the FIFO 31 and an interface core circuit 34.

The interface core circuit 34 is a circuit that provides DMA control. A counter 35 comprised by the interface core circuit 34 is a reset counter for ATA (IDE)/ATAPI. A UDMA circuit 36 comprised by the interface core circuit 34 is a circuit for controlling ATA/ATAPI UltraDMA transfers, and it comprises a FIFO 37 for UltraDMA and a CRC computation circuit 38 for UltraDMA.

A register 33 is a register for controlling the start of DMA transfer, where this register 33 can be accessed by the firmware 50 (the CPU 42).

CS[1:0] is a chip select signal used for accessing the ATA registers. DA[2:0] is an address signal for accessing data or a data port.

DMARQ and DMACK are signals used in DMA transfer. When the preparations for data transfer are complete, the storage device 100 (device) side asserts DMARQ (makes it active) and in response thereto, the data transfer control device 10 (host) side asserts DMACK when DMA transfer starts.

DIOW (STOP) is a write signal used during writing to a register or data port. Note that it also functions as a STOP signal during UltraDMA transfer. DIOR (HDMARDY or HSTROBE) is a read signal used during reading from a register or data port. Note that it also functions as a HDMARDY or HSTROBE signal during UltraDMA transfer.

IORDY (DDMARDY or DSTROBE) is used as a wait signal when the preparations for data transfer for the storage device 100 are not complete. Note that it also functions as a DDMARDY or DSTROBE signal during UltraDMA transfer.

INTRQ is a signal used by the storage device 100 (device) for requesting an interrupt with respect to the data transfer control device 10 (host). If the data transfer control device 10 reads the contents of the status register of the storage device 100 after this INTRQ is asserted, the storage device 100 negates INTRQ (makes it inactive) after a predetermined time has elapsed. This use of this INTRQ enables the storage device 100 to inform the data transfer control device 10 of the end of command processing.

Figure 17A:
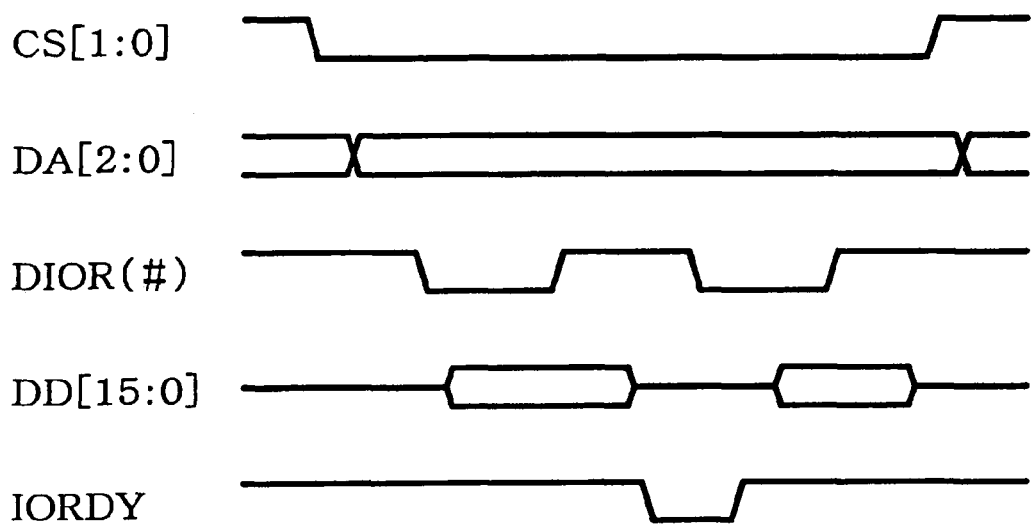
FIGS. 17A and 17B show examples of signal waveforms during PIO read and PIO write.
Figure 17B:
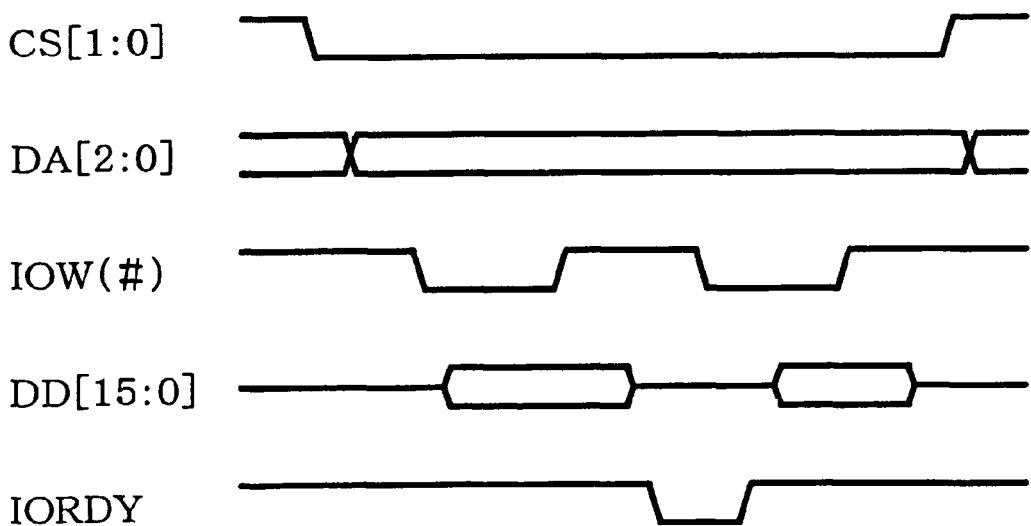

Examples of the waveforms of the above-described ATA signals as shown in FIGS. 17A and 17B. These figures show examples of the signal waveforms during parallel I/O (PIO) read and write. Note that "#" in these figures denotes signals of negative logic (low level is asserted).

Reading of the ATA register 103 is implemented by the PIO read of FIG. 16A and writing to the register 103 is implemented by the PIO write of FIG. 16B. The register reads of steps S23, S25, S26, and S28 of FIG. 9 are implemented by PIO reads, by way of example. The register write of step S24 is implemented by a PIO write.

Note that the present invention is not limited to the above embodiments and thus various modifications thereto are possible within the scope of the invention.

For example, in part of this specification, some terms (such as IEEE 1394, ATA/ATAPI, SBP-2, IPover1394, ORB, a storage device, a personal computer, a flash memory, device information, SBP-2 firmware, and CPU) are replaced by terms in a broader sense (such as a first interface standard, a second interface standard, a first protocol which is an upper layer protocol of the first interface standard, a second protocol which is an upper layer protocol of the first interface standard, command packet, device, host, non-volatile memory, GUID, data transfer control program, and processor), but these terms may be replaced also in another part of the specification.

Part of requirements of any claim of the present invention could be omitted from a dependent claim which depends on that claim. Moreover, part of requirements of any independent claim of the present invention could be made to depend on any other independent claim.

The configurations of the data transfer control device and electronic instrument of the present invention are not limited to those shown in FIG. 6 and thus various modifications thereto are possible. For example, some of the circuit blocks and functional blocks in this figure could be omitted, or the connections between the blocks could be modified. The second bus (BUS2) could be connected to a device other than a storage device. In addition, the connection of the physical-layer circuit, the link-layer circuit, and the packet buffer is not limited to that shown in FIG. 6.

The embodiments were described as relating to a configuration in which the functions of components such as the rewriter activation section and the rewriter section were implemented by firmware (programs), but all or some of these functions could equally well be implemented by hardware.

The present invention can be applied to various electronic instruments (such as hard disk drives, optical disk drives, magneto-optical disk drives, PDAs, expansion devices, audio devices, digital video cameras, mobile phones, printers, scanners, TVs, VCRs, telephones, display devices, projectors, personal computers or electronic notebooks).

The embodiments of the present invention were described as relating to a configuration in which the present invention was applied to data transfer conforming to the IEEE 1394, SBP-2, and ATA/ATAPI standards. However, the present invention can also be applied to data transfer conforming to standards based on concepts similar to those of IEEE 1394 (P1394a), SBP-2 (SBP), or ATA/ATAPI, or standards derived from IEEE 1394, SBP-2, and ATA/ATAPI.

The specification discloses the following matters about the configuration of the embodiments described above.

According to one embodiment of the present invention, there is provided a data transfer control device for data transfer through a bus, comprising:

a rewriter which loads and writes information transferred through a first bus into a rewrite area of a non-volatile memory storing at least one of device information and data transfer control program information; and a rewriter activation section which causes the rewriter to start processing when a second bus is detected to have no connection to any device.

When it is detected that the device is disconnected from the second bus (or the device is not present), processing by the rewriter starts (or the rewriter is activated), and information transferred through the first bus is downloaded and written to the rewrite area. Information such as the device information or the data transfer control program information is thus automatically written into the rewrite area when the device is disconnected from the second bus. This makes it possible to implement a data transfer control device that facilitates easy writing of data such as device information.

Note that the device information in this case could be information for identifying an electronic instrument or a data transfer control device, or device information necessary for data transfer control, by way of example. The data transfer control program information could be information of a program that controls data transfer through the first bus, by way of example. The data transfer control program in this case can include a data transfer control program having a first protocol which is an upper layer protocol of a first interface standard for the first bus.

The detection of whether or not the second bus is connected to a second device may be based on the result of an access to a register of the second device.

This access to the register could be a write to the register, a read of that register, or both. The register of the device which is possibly connected to the second bus could be a register conforming to a second interface standard for the second bus.

The rewriter may write information into the rewrite area by performing data transfer between the data transfer control device and a first device connected to the first bus in a mode of loading information to the rewrite area.

In such a case, the data transfer through the first bus in download mode can be implemented by the first interface standard, by way of example.

Data transferred from a first device through the first bus may be transferred to a second device through the second bus, and data transferred from the second device through the second bus may be transferred to the first device through the first bus, in an ordinary operating mode that differs from a mode of loading information to the rewrite area.

This makes it possible to implement a function called a bus bridge function.

The device information may include identification information that is specific to an electronic instrument in which the data transfer control device is embedded.

When this electronic instrument is connected to another electronic instrument through the first bus, therefore, this configuration makes it easy for the other electronic instrument to identify this electronic instrument.

The non-volatile memory may have an area in which is stored information for indicating whether or not the data transfer control program information has been written correctly into the rewrite area.

This configuration makes it possible to prevent a state in which erroneous data transfer control program information is written into the rewrite area.

The non-volatile memory may have an area in which is stored rewriter processing setting information for setting whether processing by the rewriter is enabled or disabled; and the rewriter processing setting information may be set to enabled in an initial state but set to disabled at the end of processing by the rewriter.

Setting the rewriter processing setting information to enabled in the initial state in this manner enables an immediate transition to rewriter processing, skipping other processing.

The first bus may transfer data conforming to a first interface standard, and the second bus may transfer data conforming to a second interface standard.

According to another embodiment of the present invention, there is provided an electronic instrument comprising any of the above-described data transfer control devices and a second device connected to the second bus.

According to further embodiment of the present invention, there is provided a program for causing a data transfer control device to function as:

a rewriter which loads and writes information transferred through a first bus into a rewrite area of a non-volatile memory storing at least one of device information and data transfer control program information; and a rewriter activation section which causes the rewriter to start processing when a second bus is detected to have no connection to any device.

According to still another embodiment of the present invention, there is provided a method of fabricating an electronic instrument having a data transfer control device and a second device connected to a second bus of the data transfer control device, the method comprising:

disconnecting the second device from the second bus to start rewriter processing that is activated when the second device is disconnected from the second bus;

loading and writing information transferred through a first bus into a rewrite area by the rewriter processing, the rewrite area storing at least one of device information and data transfer control program information; and connecting the second device to the second bus after the writing of the information into the rewrite area.

What is claimed is:

1. A data transfer control device for data transfer through a bus, comprising:

a circuit that is connectable to a first bus, the first bus being connectable to a first device;

an interface circuit that is connectable to a second bus and is coupled to the circuit, the second bus being connectable to a second device;

a non-volatile memory that stores at least one of device information and data transfer control program information and is coupled to the circuit; and a processor that is coupled to the interface circuit, a firmware stored in the non-volatile memory executed by the processor including:

a rewriter; and a rewriter activation section, the data transfer control device having a bus bridge function between the first bus conforming to a first interface standard and the second bus conforming to a second interface standard, the bus bridge function being realized by issuing a command included in a command packet transferred from the first device through the first bus, to the second device through the second bus, the rewriter activation section automatically activating the rewriter to start processing when the second bus is detected to have no connection to any device before a normal data transfer using the bus bridge function, the rewriter loading and writing information transferred from the first device through the first bus into a rewrite area of the non-volatile memory when the rewriter is activated by the rewriter activation section, when the second bus is detected to have a connection to the second device, the circuit performing packet transfer through the first bus conforming to the first interface standard and the interface circuit performing interface processing with the second device conforming to the second interface standard to realize the normal data transfer using the bus bridge function, the non-volatile memory having an area in which is stored information for indicating whether or not the data transfer control program information has been written correctly into the rewrite area.

2. The data transfer control device as defined in claim 1, wherein the detection of whether or not the second bus is connected to the second device is based on the result of an access to a register of the second device.

3. The data transfer control device as defined in claim 1, wherein the rewriter writes information into the rewrite area by performing data transfer between the data transfer control device and the first device connected to the first bus in a mode of loading information to the rewrite area.

4. The data transfer control device as defined in claim 1, wherein data transferred from the first device through the first bus is transferred to the second device through the second bus, and data transferred from the second device through the second bus is transferred to the first device through the first bus, in an ordinary operating mode that differs from a mode of loading information to the rewrite area.

5. The data transfer control device as defined in claim 1, wherein the device information includes identification information that is specific to an electronic instrument in which the data transfer control device is embedded.

6. A data transfer control device for data transfer through a bus, comprising:

a circuit that is connectable to a first bus, the first bus being connectable to a first device;

an interface circuit that is connectable to a second bus and is coupled to the circuit, the second bus being connectable to a second device;

a non-volatile memory that stores at least one of device information and data transfer control program information and is coupled to the circuit; and a processor that is coupled to the interface circuit, a firmware stored in the non-volatile memory executed by the processor including:

a rewriter; and a rewriter activation section;

that data transfer control device having a bus bridge function between the first bus conforming to a first interface standard and the second bus conforming to a second interface standard, the bus bridge function being realized by issuing a command included in a command packet transferred from the first device through the first bus, to the second device through the second bus, the rewriter activation section automatically activating the rewriter to start processing when the second bus is detected to have no connection to any device before a normal data transfer using the bus bridge function, the rewriter loading and writing information transferred from the first device through the first bus into a rewrite area of the non-volatile memory when the rewriter is activated by the rewriter activation section, when the second bus is detected to have a connection to the second device, the circuit performing packet transfer through the first bus conforming to the first interface standard and the interface circuit performing interface processing with the second device conforming to the second interface standard to realize the normal data transfer using the bus bridge function, the non-volatile memory having an area in which is stored rewriter processing setting information for setting whether processing by the rewriter is enabled or disabled; and the rewriter processing setting information being set to be enabled in an initial state but being set to be disabled at the end of processing by the rewriter.

7. An electronic instrument comprising:

a data transfer control device including a circuit that is connectable to a first bus, the first bus being connectable to a first device;

an interface circuit that is connectable to a second bus and is coupled to the circuit, the second bus being connectable to a second device;

a non-volatile memory that stores at least one of device information and data transfer control program information and is coupled to the circuit; and a processor that is coupled to the interface circuit, a firmware stored in the non-volatile memory executed by the processor including:

a rewriter; and a rewriter activation section, and the second device connected to the second bus;

the data transfer control device having a bus bridge function between the first bus conforming to a first interface standard and the second bus conforming to a second interface standard, the bus bridge function being realized by issuing a command included in a command packet transferred from the first device through the first bus, to the second device through the second bus, the rewriter activation section automatically activating the rewriter to start processing when the second bus is detected to have no connection to any device before a normal data transfer using the bus bridge function, the rewriter loading and writing information transferred from the first device through the first bus into a rewrite area of the non-volatile memory when the rewriter is activated by the rewriter activation section, when the second bus is detected to have a connection to the second device, the circuit performing packet transfer through the first bus conforming to the first interface standard and the interface circuit performing interface processing with the second device conforming to the second interface standard to realize the normal data transfer using the bus bridge function, the non-volatile memory having an area in which is stored information for indiating whether or not the data transfer control program information has been written correctly into the rewrite area.

8. An electronic instrument comprising:

a data transfer control device including a circuit that is connectable to a first bus, the first bus being connectable to a first device;

an interface circuit that is connectable to a second bus and is coupled to the circuit, the second bus being connectable to a second device;

a non-volatile memory that stores at least one of device information and data transfer control program information and is coupled to the circuit; and a processor that is coupled to the interface circuit, a firmware stored in the non-volatile memory executed by the processor including:

a rewriter; and a rewriter activation section, and the second device connected to the second bus;

that data transfer control device having a bus bridge function between the first bus conforming to a first interface standard and the second bus conforming to a second interface standard, the bus bridge function being realized by issuing a command included in a command packet transferred from the first device through the first bus, to the second device through the second bus, the rewriter activation section automatically activating the rewriter to start processing when the second bus is detected to have no connection to any device before a normal data transfer using the bus bridge function, the rewriter loading and writing information transferred from the first device through the first bus into a rewrite area of the non-volatile memory when the rewriter is activated by the rewriter activation section, when the second bus is detected to have a connection to the second device, the circuit performing packet transfer through the first bus conforming to the first interface standard and the interface circuit performing interface processing with the second device conforming to the second interface standard to realize the normal data transfer using the bus bridge information, the non-volatile memory having an area in which is stored rewriter processing setting information for setting whether processing by the rewriter is enabled or disabled; and the rewriter processing setting information being set to be enabled in an initial state but being set to be disabled at the end of processing by the rewriter.

* * * * *